United States Patent [19]
Koon et al.

[11] Patent Number: 5,966,475
[45] Date of Patent: *Oct. 12, 1999

[54] SYSTEM FOR ENLARGING AND SMOOTHING TEXTUAL CHARACTERS

[75] Inventors: Siew Keng Koon; Xue Feng Shen, both of Singapore, Singapore

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/804,504

[22] Filed: Feb. 20, 1997

[51] Int. Cl.⁶ ..................................................... G06K 9/32
[52] U.S. Cl. ........................... 382/301; 382/266; 382/269
[58] Field of Search ..................... 382/298, 299, 382/300–301, 260, 266, 269, 128; 348/625; 345/202; 358/447–448, 459, 625, 451

[56] References Cited

U.S. PATENT DOCUMENTS

| | | | |
|---|---|---|---|
| 4,437,122 | 3/1984 | Walsh et al. | 358/625 |
| 4,598,372 | 7/1986 | McRoberts | 345/202 |
| 4,611,349 | 9/1986 | Hou | 382/269 |
| 4,703,363 | 10/1987 | Kitamura | 358/448 |
| 5,170,442 | 12/1992 | Murai et al. | 382/301 |
| 5,212,740 | 5/1993 | Pack et al. | 382/266 |
| 5,249,242 | 9/1993 | Hanson et al. | 382/269 |
| 5,270,836 | 12/1993 | Kang | 382/459 |
| 5,271,064 | 12/1993 | Dhawan et al. | 382/266 |
| 5,293,579 | 3/1994 | Stockholm | 382/269 |
| 5,301,037 | 4/1994 | Kang et al. | 358/451 |
| 5,351,305 | 9/1994 | Wood et al. | 382/128 |
| 5,390,264 | 2/1995 | Ishihara et al. | 382/260 |
| 5,404,233 | 4/1995 | Nagata et al. | 358/447 |
| 5,537,495 | 7/1996 | Overton | 382/269 |
| 5,644,366 | 7/1997 | Ushida et al. | 348/625 |

*Primary Examiner*—Leo H. Boudreau
*Assistant Examiner*—Ishrat Sherali

[57] ABSTRACT

Described above is a method of enlarging a character that is represented by a reference pattern of pixels. The method includes a step of converting pixels of the reference pattern to corresponding rectangles of pixels in an enlarged pattern of pixels. Further steps includes identifying acute right angles in the reference pattern, wherein each such acute right angle has horizontal and vertical edges with corresponding lengths, and determining the lengths of the horizontal and vertical edges of the acute right angles. Right angles neighboring identified acute right angles are also found and the lengths of their edges are calculated. A determination of whether to smooth a right angle in the enlarged pattern is made by examining the corresponding right angle in the reference pattern and its neighboring right angles. Specifically, the determination is made based upon the lengths of the edges of the various right angles.

19 Claims, 24 Drawing Sheets

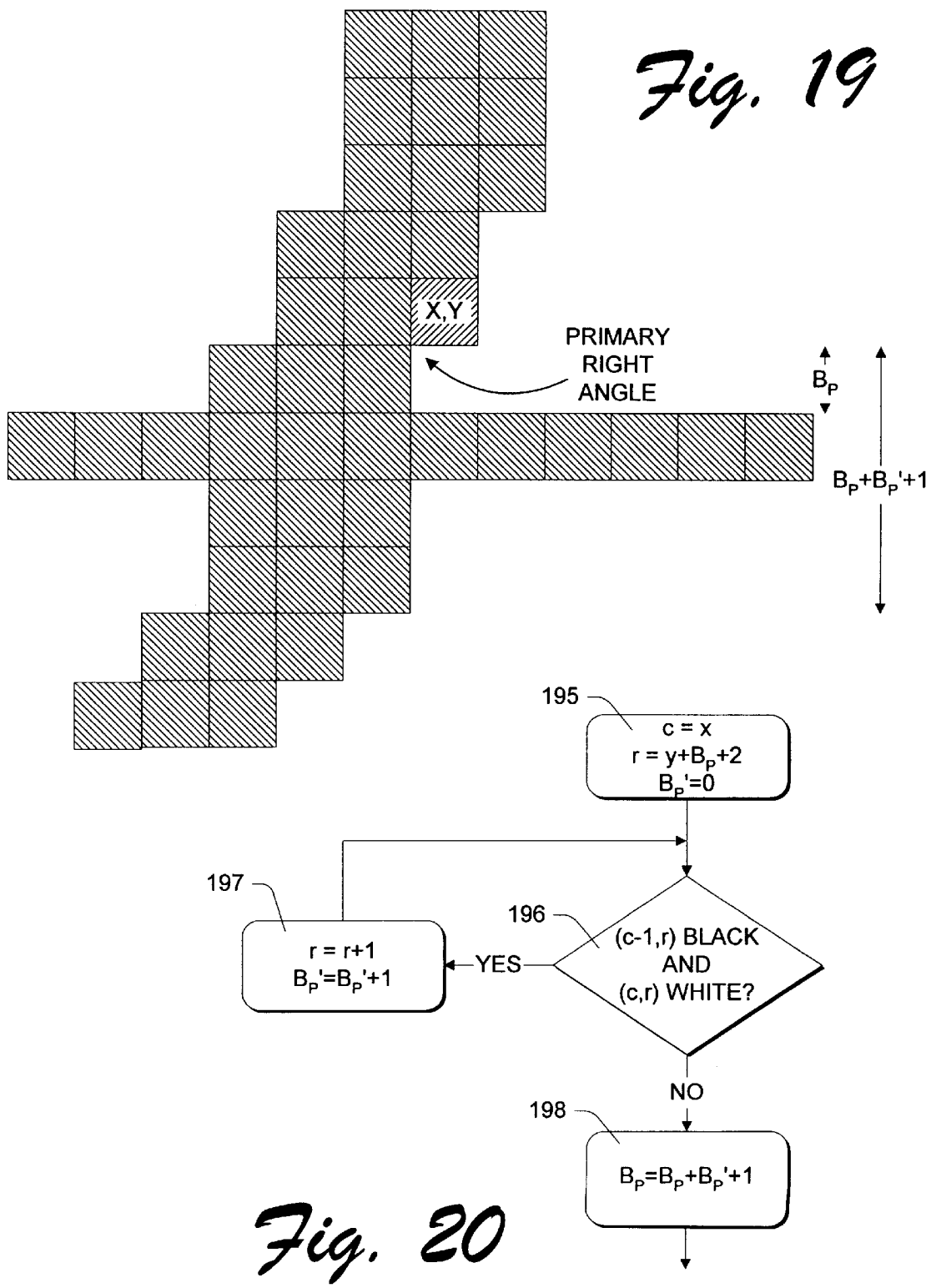

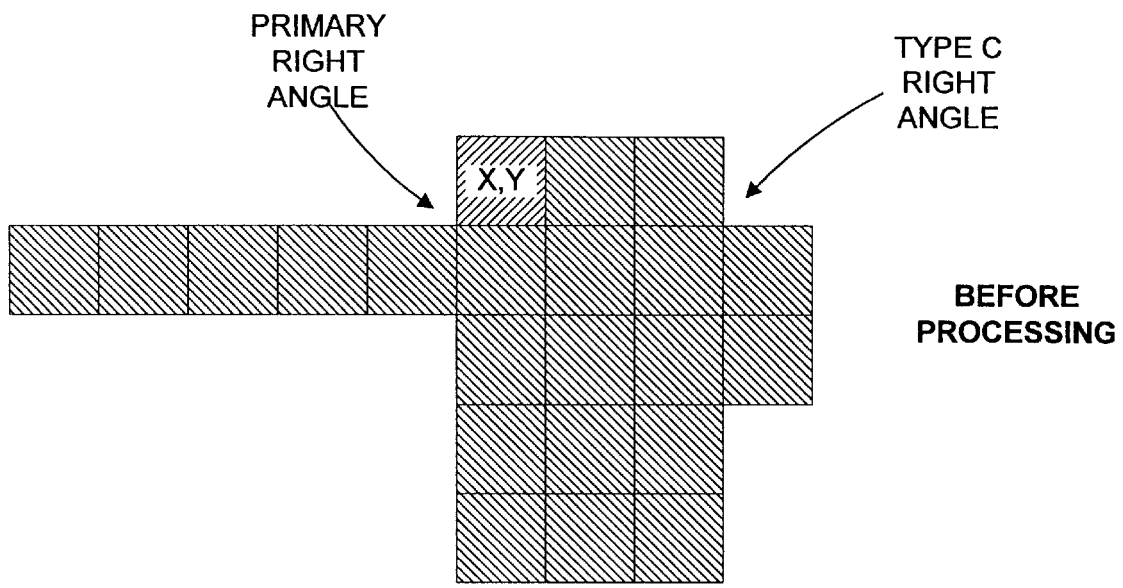
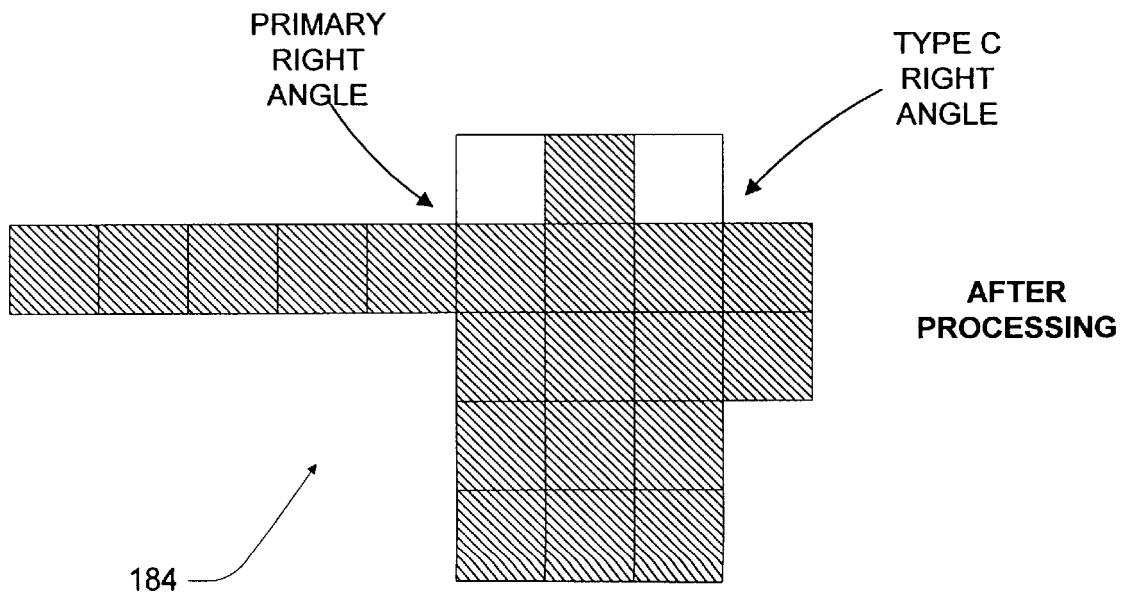
Fig. 29

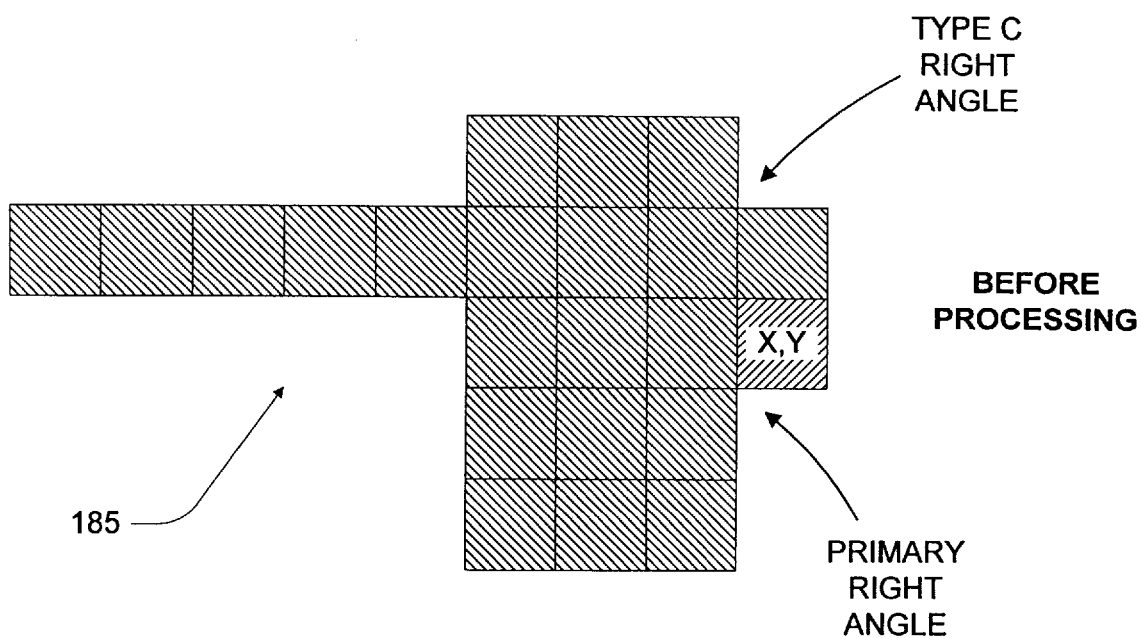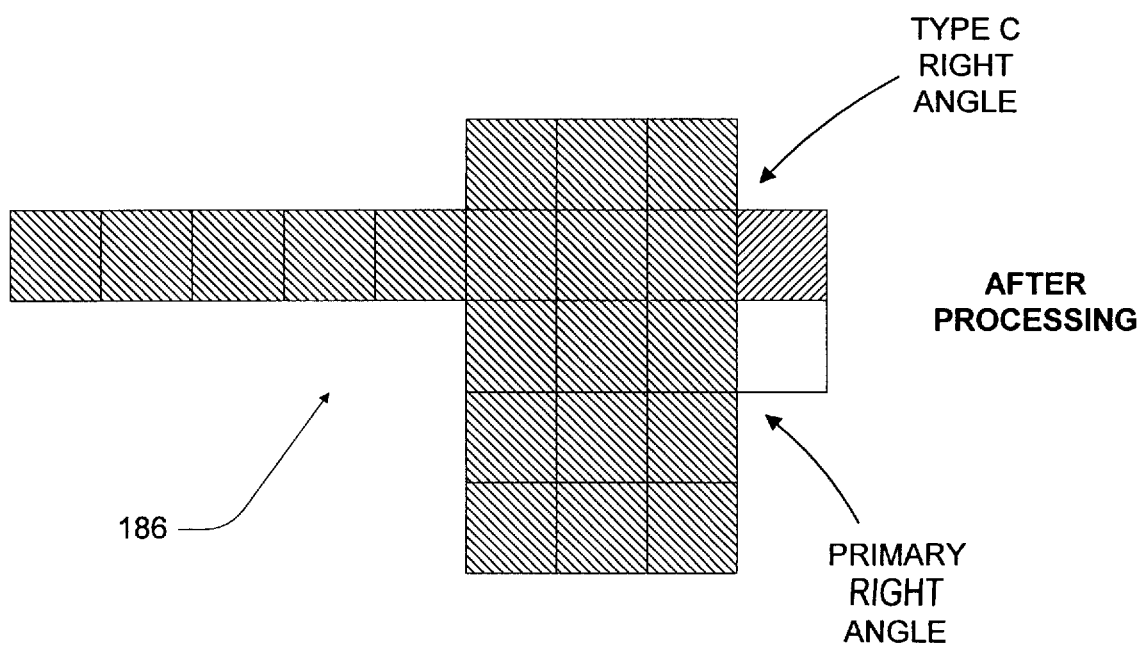
Fig. 30

SYSTEM FOR ENLARGING AND SMOOTHING TEXTUAL CHARACTERS

TECHNICAL FIELD

This invention relates to enlarging and smoothing textual characters that are represented by pixel arrays.

BACKGROUND OF THE INVENTION

Computer and computer-related equipment commonly use bitmaps to represent textual characters. A bitmap is a two-dimensional array of bits or values corresponding to a similar two-dimensional array of pixels on a display or printed page. In a simple bitmap representing a character, a pixel or potential dot position is represented by a single bit. If the bit is equal to "1", a dot is to be printed or displayed in that pixel position. If the bit is equal to "0", no dot is to be printed or displayed in that pixel position—the position is left blank or printed with a background color.

When printing, it is possible for a computer to send actual bitmaps to a printer. In many cases, however, a printer will store one or more libraries of character bitmaps that can be used by the computer without downloading.

It is desirable to limit the amount of memory required to store the bitmaps in the printer. Accordingly, the bitmaps are often stored at a low pixel resolution (small number of pixels) compared to the higher resolution (higher number of pixels) at which they will be printed. Before printing a particular character, its bitmap must be enlarged to an appropriate size. Many printers allow characters to be scaled by a variable factor before printing.

Most enlargement schemes start with a one-to-one mapping of every pixel in a reference bitmap to a corresponding rectangular region or pixel array in an enlarged bitmap. If a dot is present at a particular pixel location in the reference bitmap, every pixel location in the corresponding rectangular region of the enlarged bitmap is filled in with dots.

While this scheme results in an accurate enlargement of the reference bitmap, it causes a degradation in perceived print quality. This is primarily because of diagonal edges in the bitmaps. Since each pixel of the reference bitmap is represented in the enlarged bitmap by a rectangular region of dots, diagonal edges appear to as a series of "stairsteps." In other words, diagonal edges are jagged rather than smooth.

Edge smoothing algorithms have been developed to improve the perceived print quality of enlarged character bitmaps. However, the effectiveness of these algorithms depends on the ability to detect the correct edges to smooth. This is especially important with ideographic characters like Chinese, Kanji, and Hanja.

Many edge smoothing algorithms are implemented in hardware with a method of mask comparison. Hardware implementations have the benefit of faster computational speed when compared to software implementations, but are not as portable to different character sets and fonts. Moreover, the results of mask comparison are highly dependent on the set of masks being employed in the edge detection process. The more cells in the masks, the more accurate the edge detection process. Hence, the tradeoff for an accurate edge smoothing process is often a loss in throughput.

It would be desirable to provide an edge smoothing method that achieves both high throughput and superior print quality, while conserving memory and other hardware resources.

SUMMARY OF THE INVENTION

The invention is a method of enlarging and smoothing textual characters. The described method includes identifying right angles in the original character bitmap, and also finding upper and lower neighboring right angles for each identified right angle. Lengths for the horizontal and vertical edges of the right angles are determined, and the determination of whether to smooth a particular right angle in the enlarged bitmap is based upon the lengths of the edges of the right angles in the original bitmap.

BRIEF DESCRIPTION OF THE DRAWINGS

FIG. 19 shows another cross structure that is handled as an exception to normal processing steps.

FIG. 20 shows steps that are performed in response to a cross structure such as than shown in FIG. 19.

FIGS. 25–33 illustrate further structures that are handled as exceptions to normal processing steps.

DETAILED DESCRIPTION

Figure 1:
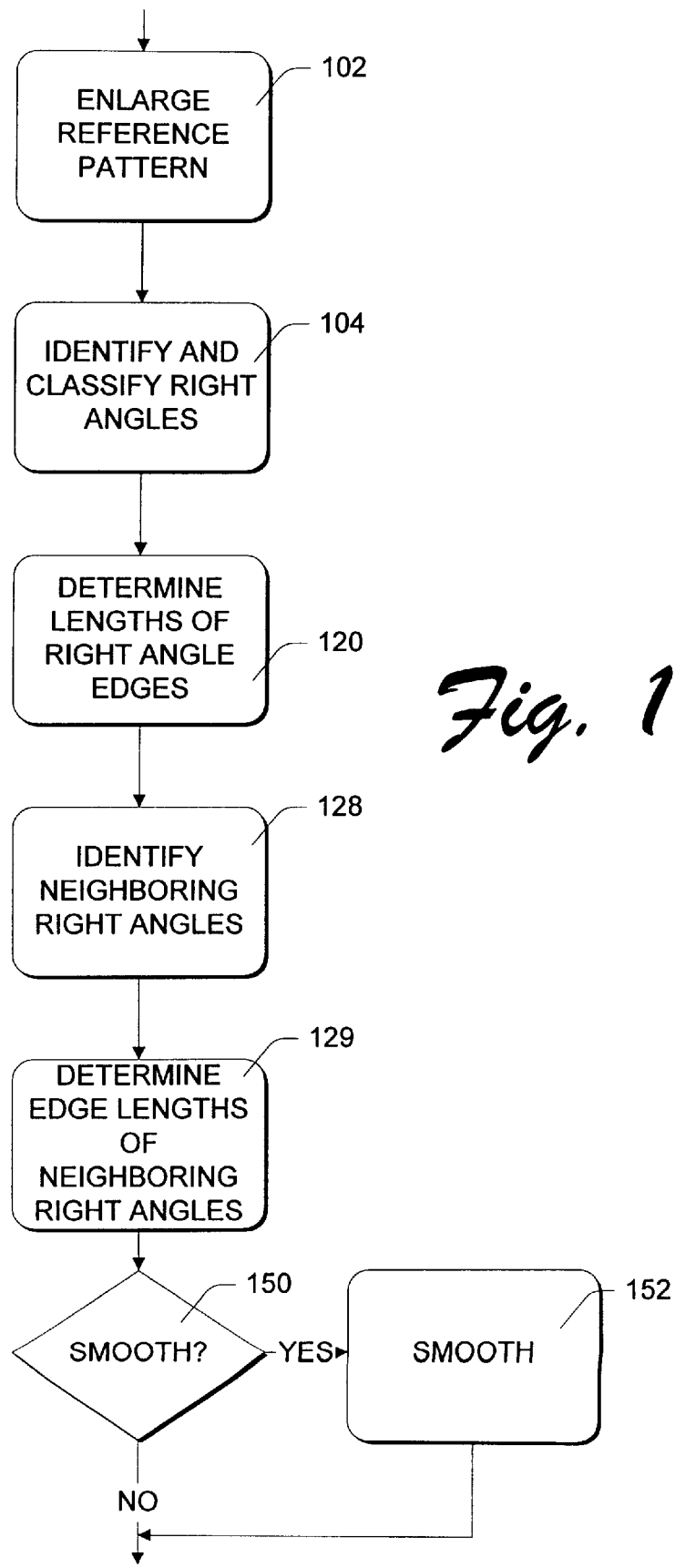
FIG. 1 is a flowchart showing preferred top-level steps in accordance with an embodiment of the invention.
Figure 2:
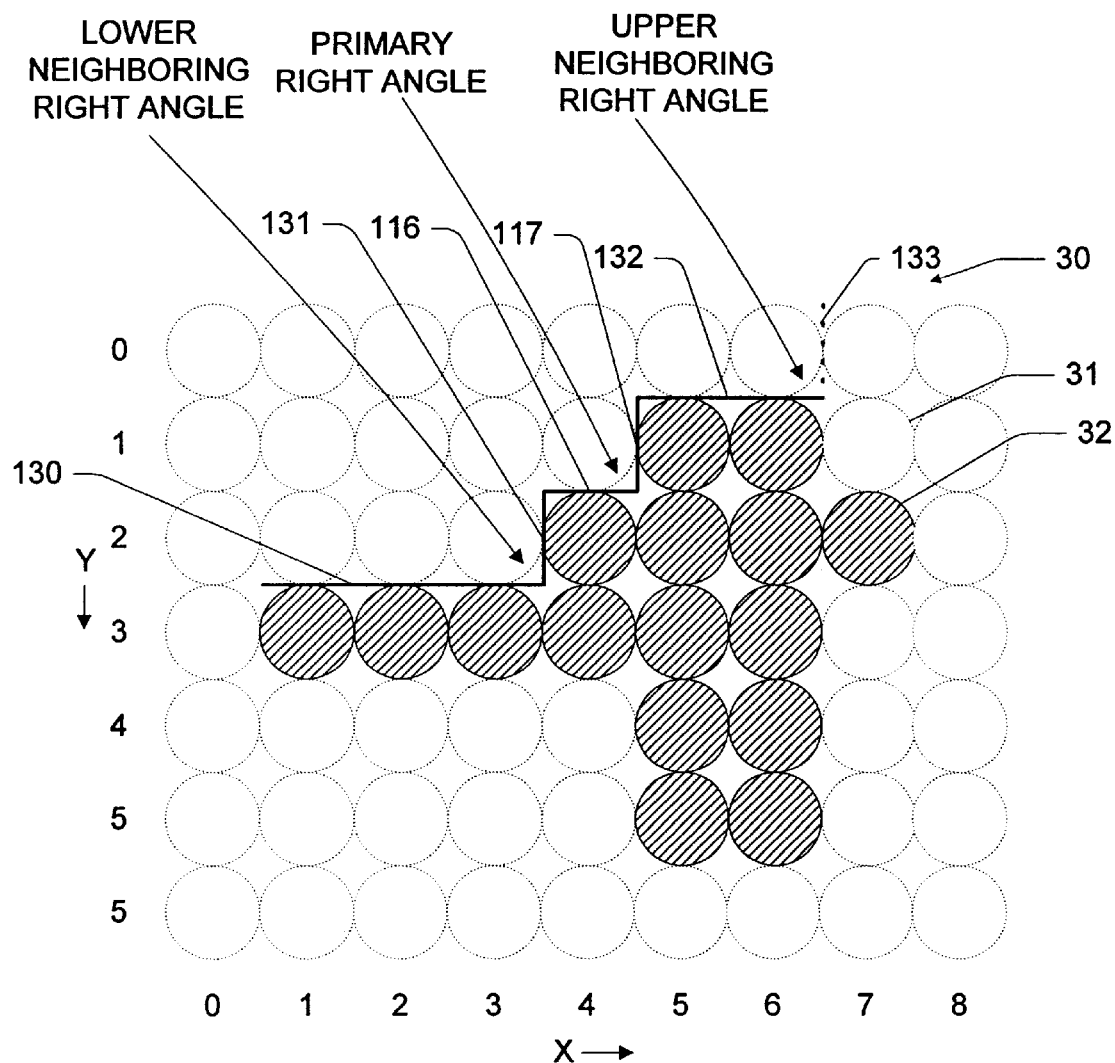
FIG. 2 shows an exemplary reference pixel pattern.

FIG. 1 shows top-level steps in accordance with a preferred method of enlarging a textual character, wherein the textual character is represented by a first or reference pattern of pixels. FIG. 2 shows a small portion of such a reference pattern or bitmap, generally designated by reference numeral 30, which will be used to illustrate the preferred steps of the invention. Reference pattern 30 includes a plurality of pixels or potential dot positions. Unfilled or blank positions are indicated by open or unfilled circles 31. Filled or printed positions are indicated by hatched circles 32. In this example, the filled or printed positions represent a small portion of a Chinese ideographic character.

The pixels are arbitrarily indexed by X-Y coordinate positions. The X coordinate extends from left to right, and the Y coordinate extends from top to bottom. The position of the upper left pixel is referred to as position (0,0), indicating its X and Y coordinates, respectively.

Figure 3:
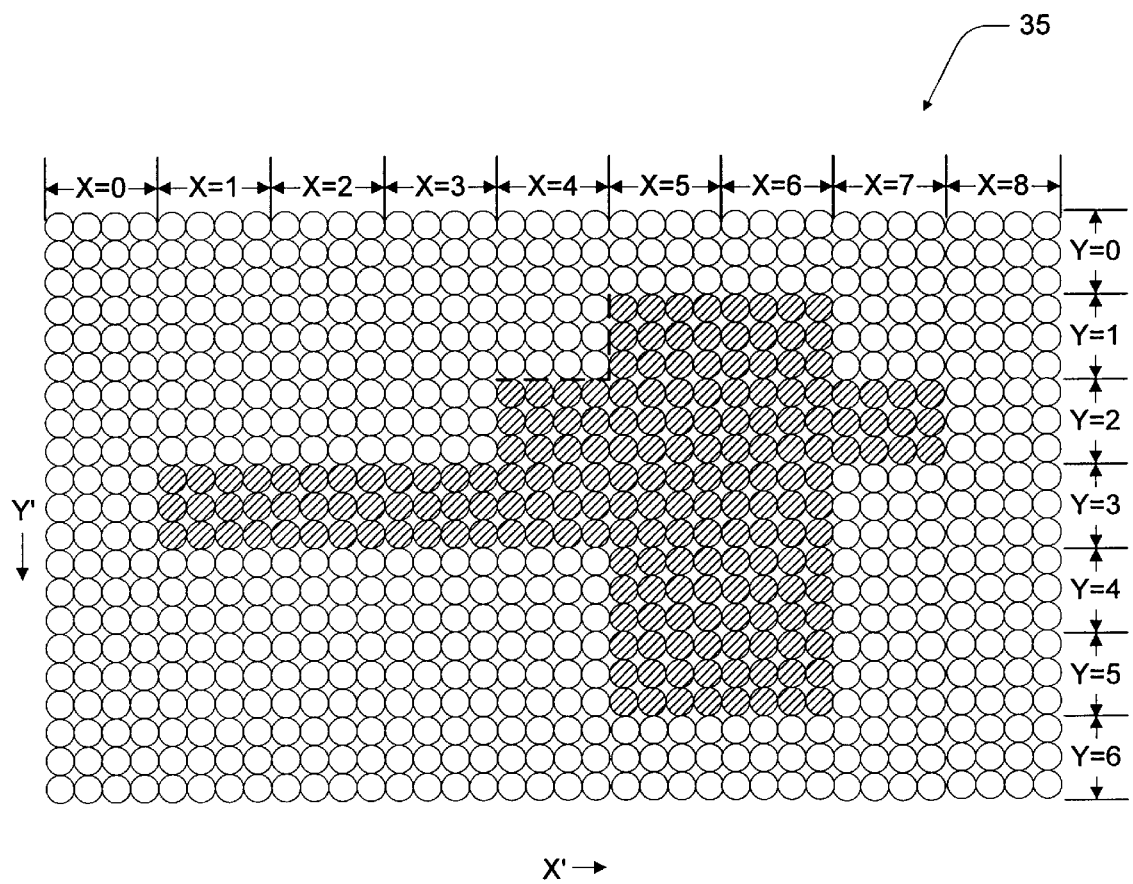
FIG. 3 shows an enlarged pixel pattern based on the reference pattern of FIG. 2.

A first step 102 in accordance with the invention comprises enlarging the reference pattern to create an enlarged or scaled bitmap. This step generally comprises converting pixels of the reference pattern to corresponding rectangles of pixels in a second or enlarged pattern of pixels. An example of a portion of an enlarged bitmap or pattern, corresponding to reference pattern 30, is shown in FIG. 3 generally designated by reference numeral 35. In this case, reference pattern 30 has been enlarged by a factor of four in the X coordinate, and by a factor of three in the Y coordinate. The result is shown in terms of X' and Y' coordinates in FIG. 3, with the corresponding X and Y coordinate values labeled on the upper and right sides of pattern 30, respectively.

Each pixel of reference pattern 30 corresponds to a rectangle of pixels in enlarged pattern 35. As an example, pixel (0,0) of reference pattern 30 (using X,Y coordinates) corresponds to pixels in enlarged pattern 35 at positions having X' coordinates of 0 through 3 and Y' coordinates of 0 through 2, inclusively. As another example, pixel (5,1) of reference pattern 30 corresponds to pixels in enlarged pattern 35 at positions having X' coordinates of 20 through 23 and Y' coordinates of 3 through 5, inclusively.

Referring again to FIG. 1, a step 104 comprises identifying and classifying acute right angles in the reference pattern by sequentially checking individual pixels of the reference pattern to determine if they form acute right angles in conjunction with neighboring pixels. In the example of FIG. 2, checking the pixel at position (5,1) reveals that it forms an acute right angle in conjunction with the pixel at position (4,2). The acute right angle is identified in FIG. 2 as a "primary" right angle. Each acute right angle in the reference pattern has a corresponding is right angle in the enlarged pattern. The right angle corresponding to the identified primary right angle of FIG. 2 is shown by heavy dashed lines in FIG. 3. This is an angle that potentially needs to be smoothed.

Figure 4:
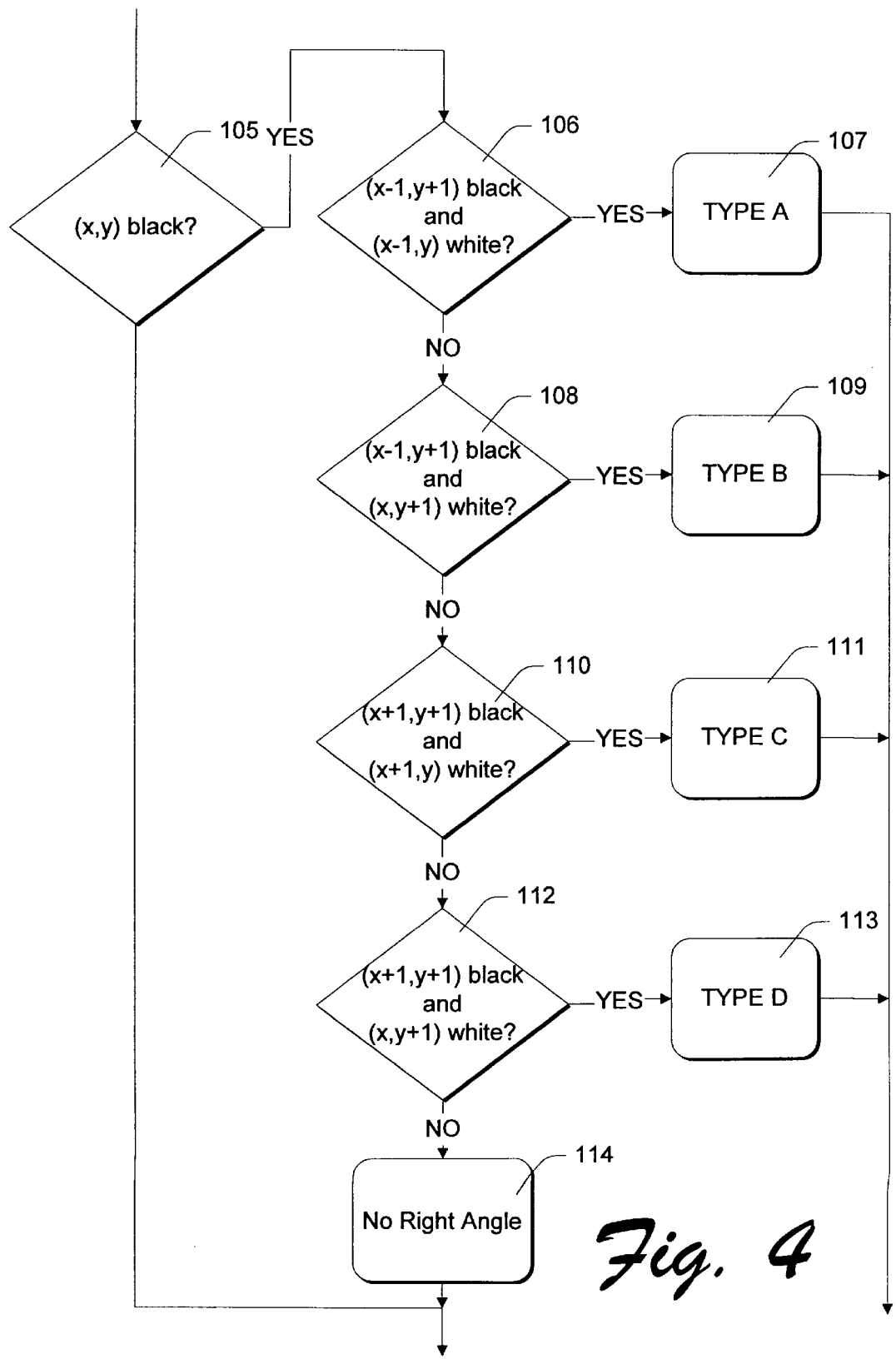
FIG. 4 is a flowchart showing how to identify and classify right angles in the reference pixel pattern of FIG. 2.
Figure 5:
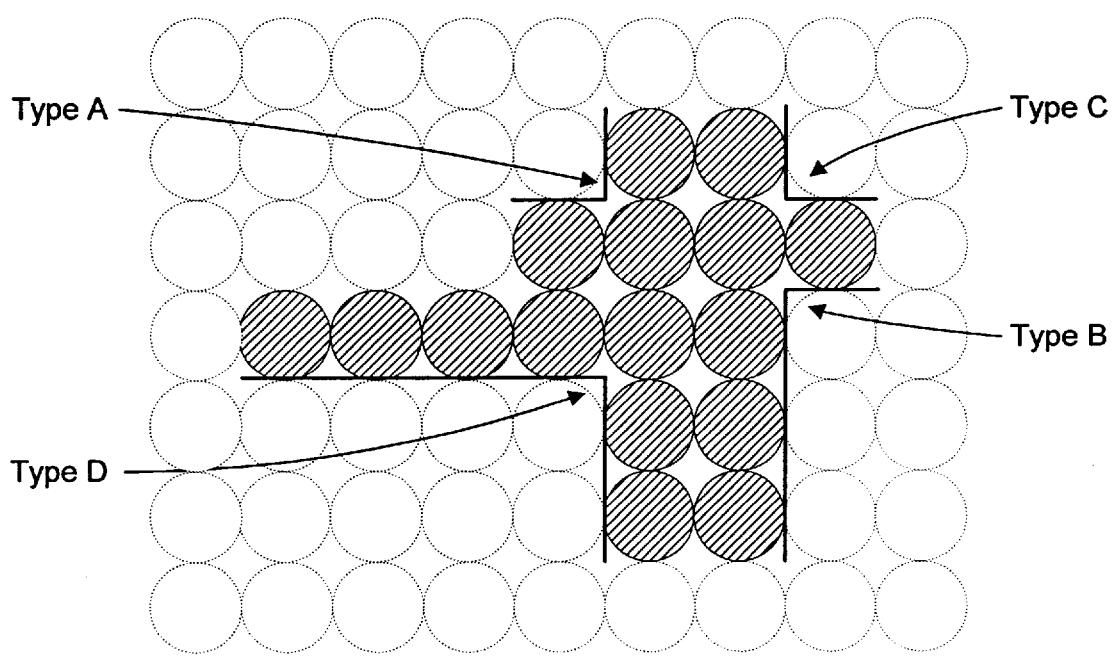
FIG. 5 illustrates different classifications of right angles.

FIG. 4 shows more detailed steps involved in determining whether a particular printed dot (xy) forms an acute right angle. These steps, performed with respect to each printed pixel, also classify any identified right angle according to its orientation: a Type A right angle is one that faces up and left; a Type B right angle is one that faces down and right; a Type D right angle is one that faces down and left; a Type C right angle is one that faces up and right. FIG. 5 illustrates these different classifications of right angles in conjunction with the exemplary pixel pattern.

The steps of FIG. 4 comprise sequentially checking whether a particular dot (x,y) forms any one of the four types of right angles. In the following discussion, a pixel position that is to be printed is referred to as being black, and a pixel position that is to be left blank or printed with a background color is referred to as being white.

A first step 105 comprises checking whether current dot (x,y) is black. If not, it is skipped and processing continues with the next dot location. A step 106 comprises checking whether dot (x−1,y+1) is black, and whether dot (x−1,y) is white. If the result of this test is true, the algorithm concludes that dot (x,y) indeed forms an acute right angle, and in step 107 classifies it as a type A right angle. A step 108 comprises checking whether dot (x−1,y+1) is black, and whether dot (x,y+1) is white. If the result of this test is true, the algorithm concludes again that dot (xy) forms an acute right angle, and in step 109 classifies it as a type B right angle. Step 110 comprises checking whether dot (x+1,y+1) is black, and whether dot (x+1,y) is white. If the result of this test is true, dot (x,y) forms an acute right angle, and in step 111 the algorithm classifies it as a type C right angle. Step 112 comprises checking whether dot (x+1,y+1) is black, and whether dot (x,y+1) is white. If the result of this test is true, dot (x,y) forms an acute right angle, and in step 113 the algorithm classifies it as a type D right angle. If none of these steps are true, it is determined in step 114 that pixel (x,y) does not form an acute right angle.

Each acute right angle of the reference pattern is formed by a horizontal edge 116 and a vertical edge 117 (FIG. 2), each having a corresponding length. Returning to FIG. 1, the next step 120 comprises determining the lengths of the horizontal and vertical edges 116 and 117 of the primary right angle in the reference pattern. In the example of FIG. 2, the length of each edge is one pixel.

Figure 6:
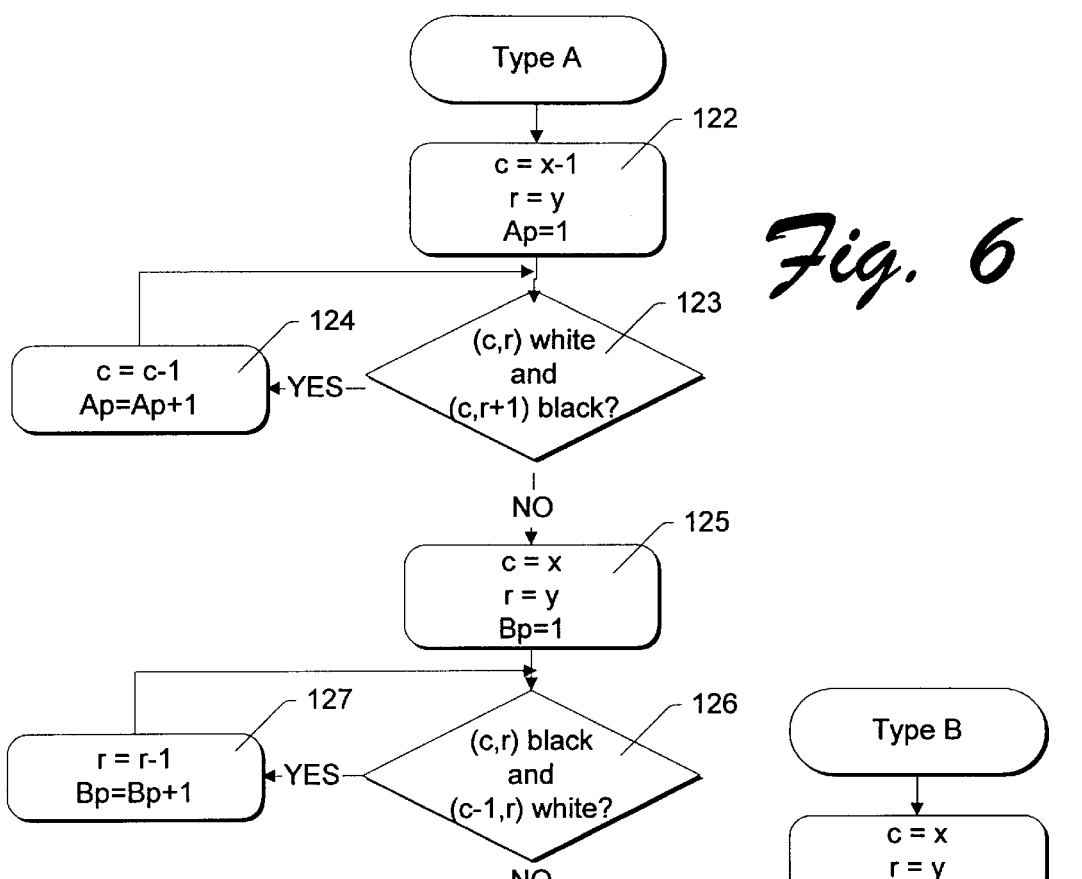
FIGS. 6–9 are flowcharts showing methodological steps of determining edge lengths of Type A, B, C, and D right angles, respectively.
Figure 7:
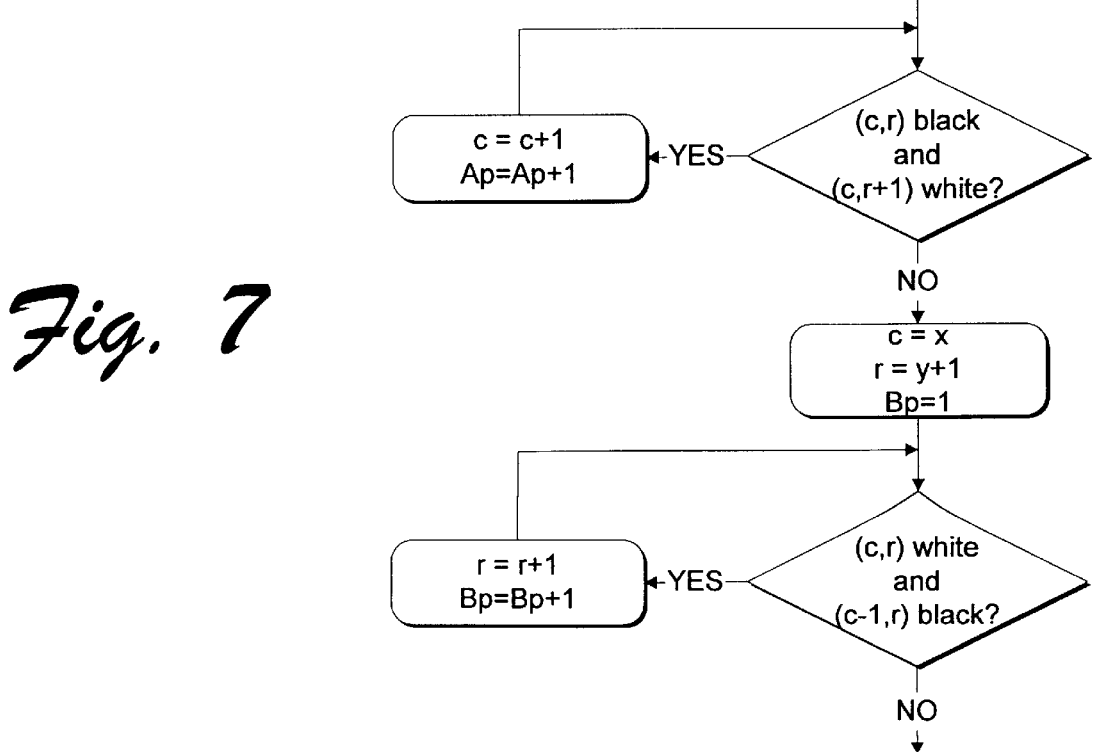
Figures 8, 9:
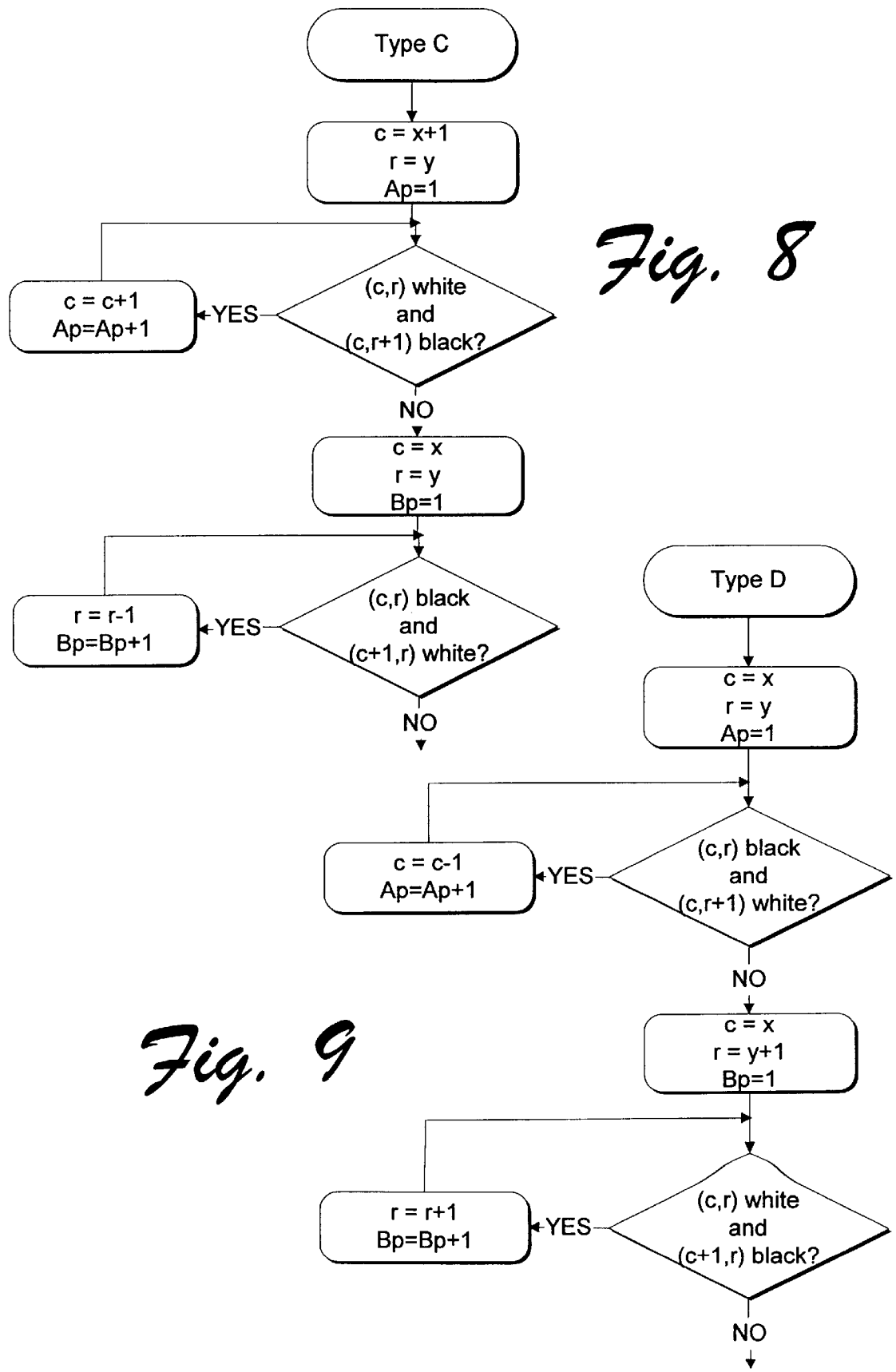

FIGS. 6–9 show preferred procedures for determining lengths of the horizontal and vertical edges of the different classifications of acute right angles in the reference pattern. Only one of these procedures is actually executed for each identified right angle. The procedure of FIG. 6 is executed for a Type A right angle. The procedure of FIG. 7 is executed for a Type B right angle. The procedure of FIG. 8 is executed for a Type C right angle. The procedure of FIG. 9 is executed for a Type D right angle. Only the procedure of FIG. 6, for Type A right angles, will be described since all of the four procedures are similar.

A step 122 comprises setting a variable c equal to x−1: one column left of the current pixel. A variable r is set equal to y: the row of the current pixel. A variable $A_P$, which is to represent the length of the horizontal edge of the primary right angle, is initialized to one.

A step 123 comprises determining whether pixel (c,r) is white and pixel (c,r+1) is black. If both of these conditions are true, a step 124 is executed of decrementing variable c and also incrementing variable $A_P$. Step 123 is then iterated. When the test of step 123 is false, the current value of variable $A_P$ is taken as the horizontal edge length of the primary acute right angle, and execution proceeds with further steps to determine the length of the vertical edge of the primary acute right angle.

To determine the length of the vertical edge of the primary acute right angle, step 125 comprises setting variable c equal to x: the column of the current pixel. Variable r is set equal to y: the row of the current pixel. A variable $B_P$, which is to represent the length of the vertical edge of the primary right angle, is initialized to one.

A step 126 comprises determining whether pixel (c,r) is black and pixel (c−1,r) is white. If both of these conditions are true, a step 127 is executed of decrementing variable r and also incrementing variable $B_P$. Step 126 is then iterated. When the test of step 126 is false, the current value of variable $B_p$ is taken as the vertical edge length of the primary acute right angle.

As mentioned, the procedures of FIGS. 7–9 are similar to that of FIG. 6 except for details of variable manipulation.

Referring back to FIG. 1, a next step 128 comprises identifying neighboring right angles in the reference pattern for each identified acute right angle. More specifically, this step involves identifying an upper neighboring right angle and a lower neighboring right angle corresponding to each identified primary right angle. By definition, these angles will exist for every identified primary acute right angle in the reference pattern. Each such neighboring angle will consist of a horizontal edge and a vertical edge, although one of these edges might have a length equal to zero. A step 129 in FIG. 1 comprises determining the lengths of the horizontal and vertical edges of the neighboring right angles in the reference pattern.

Figure 14A:
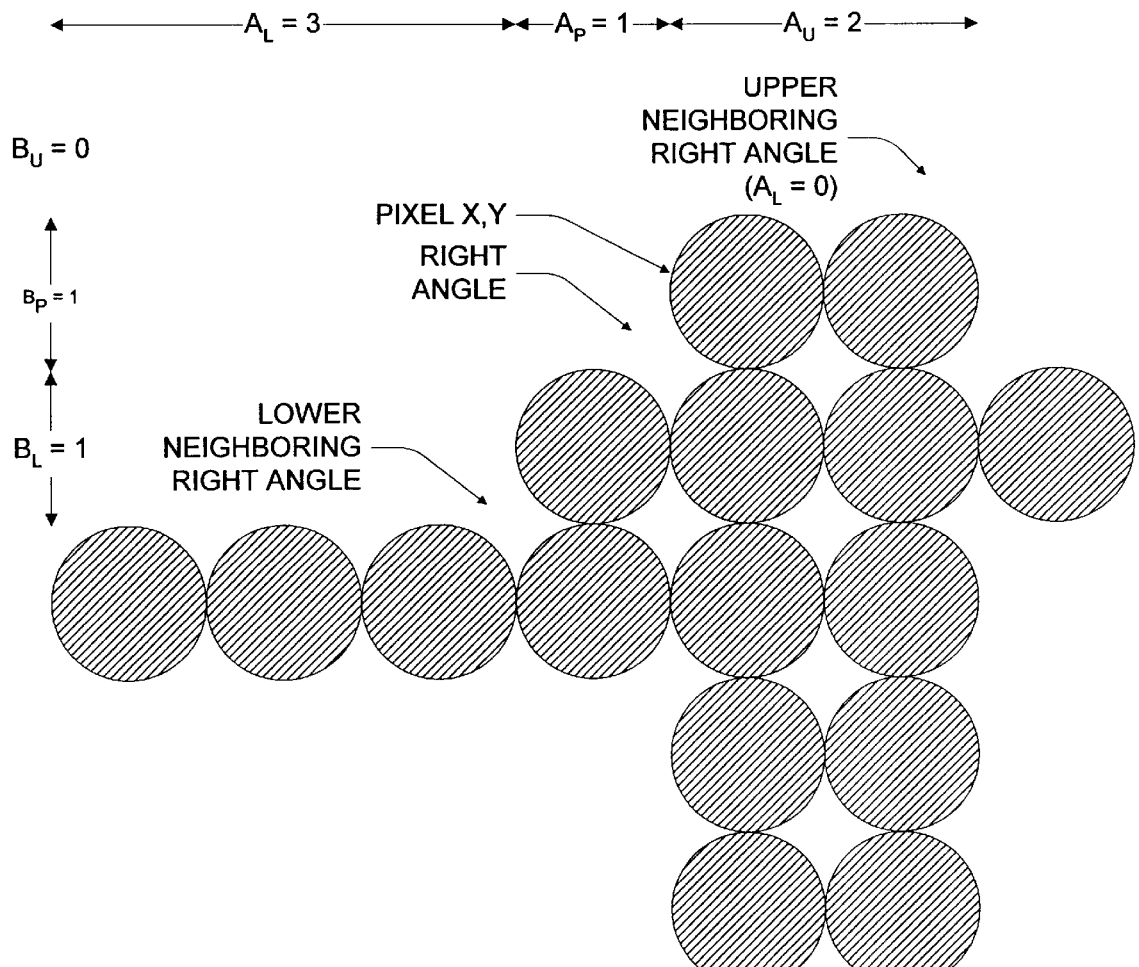
FIG. 14A shows an example character structure and indicates the various edge lengths for a primary right angle and neighboring right angles.

Neighboring right angles are identified in FIG. 2 with reference to the example reference pattern and to the identified primary acute right angle. The lower neighboring right angle is formed by black or printed pixels (1,3), (2,3), (3,3), and (4,2). Pixels (1,3), (2,3), and (3,3) form a horizontal edge 130 of the lower neighboring right angle, having a length of three pixels. Pixel (4,2) forms a vertical edge 131 of the lower neighboring right angle, having a length of one pixel. The upper neighboring right angle is formed by black or printed pixels (6,1) and (5,1), which form a horizontal edge 132 having a length of two pixels. In this example, the vertical edge 133 of the upper neighboring right angle has a length of zero. FIG. 14A shows this same structure, with the edge lengths identified.

Figure 10:
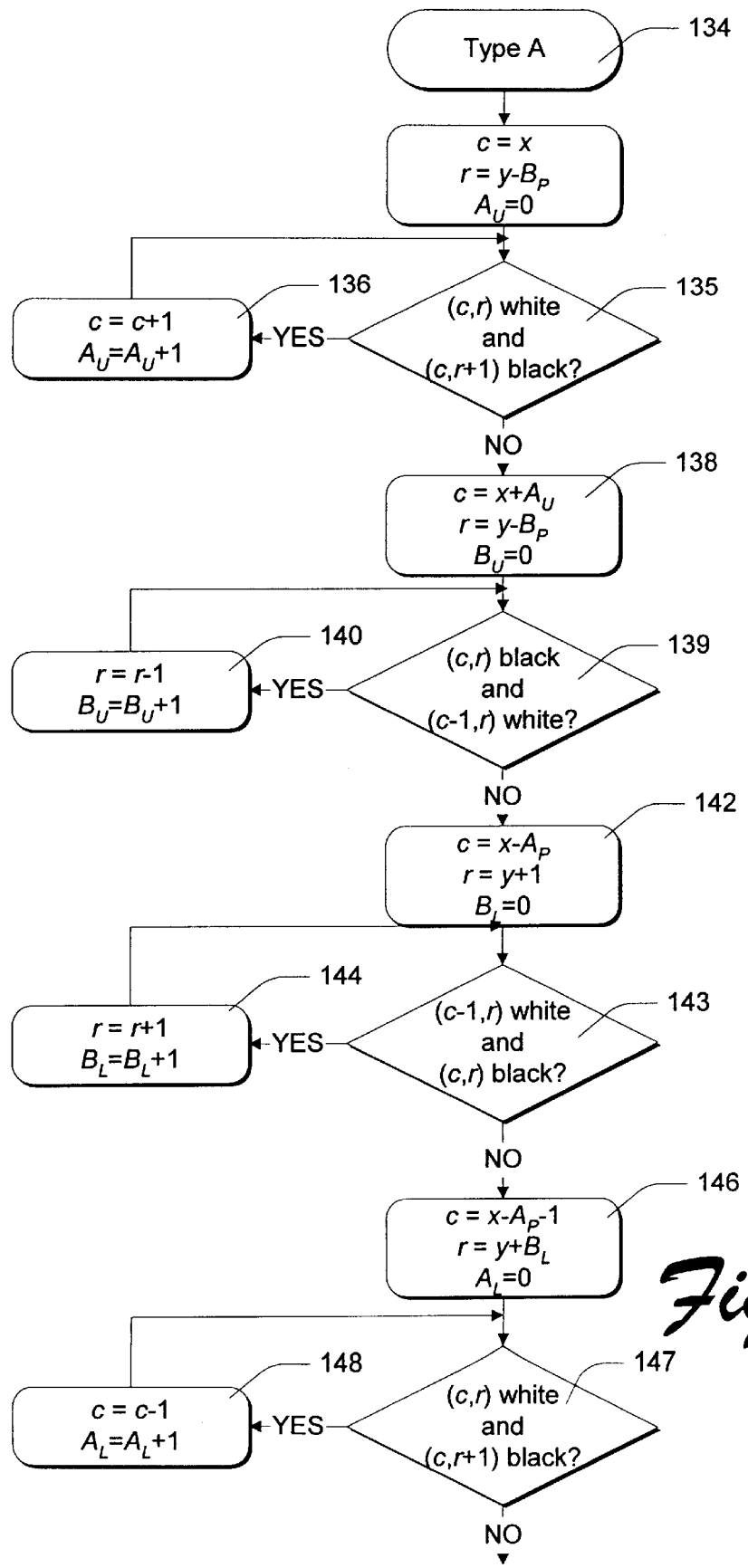
FIGS. 10–13 are flowcharts showing methodological steps of determining edge lengths of right angles that neighbor Type A, B, C, and D right angles, respectively.

In practice, steps 128 and 129 are implemented in a common procedure, which differs slightly for each classification of acute right angle. FIG. 10 illustrates the procedure used for a Type A right angle formed by a pixel at position (x,y) in the reference pattern of pixels.

A step 134 comprises setting a column variable c to x, and a row variable r to the value y–$B_P$. A variable $A_U$, representing the length of the horizontal edge of the upper neighboring right angle, is initialized to zero.

Step 135 comprises checking whether the pixel at position (c,r) is white, and whether the pixel at position (c,r+1) is black. If both of these conditions are true, step 136 is executed of incrementing $A_U$ and variable c. Step 135 is then repeated. When the result of step 135 becomes false, $A_U$ is taken as the length of the horizontal edge of the upper neighboring right angle.

Subsequent steps 138, 139, and 140 are then executed to determine the length $B_U$ of the vertical edge of the upper neighboring right angle. Step 138 comprises setting column variable c to x+$A_U$, and row variable r to the value y–$B_P$. Variable $B_U$ is initialized to zero.

Step 139 comprises checking whether the pixel at position (c,r) is black, and whether the pixel at position (c–1,r) is white. If both of these conditions are true, step 140 is executed of incrementing $B_U$ and decrementing variable r. Step 139 is then repeated. When the result of step 139 becomes false, $B_U$ is taken as the length of the vertical edge of the upper neighboring right angle.

Steps 142, 143, and 144 are then executed to determine the length $B_L$ of the vertical edge of the lower neighboring right angle. Step 142 comprises setting column variable c to x–$A_P$, and row variable r to the value y+1. Variable $B_L$ is initialized to zero.

Step 143 comprises checking whether the pixel at position (c,r) is black, and whether the pixel at position (c–1,r) is white. If both of these conditions are true, step 144 is executed of incrementing $B_L$ and variable r. Step 143 is then repeated. When the result of step 143 becomes false, $B_L$ is taken as the length of the vertical edge of the lower neighboring right angle.

Steps 146, 147, and 148 are executed to determine the length $A_L$ of the horizontal edge of the lower neighboring right angle. Step 146 comprises setting column variable c to x–$A_P$–1, and row variable r to the value y+$B_L$. Variable $A_L$ is initialized to zero.

Step 147 comprises checking whether the pixel at position (c,r) is white, and whether the pixel at position (c,r+1) is black. If both of these conditions are true, step 148 is executed of incrementing $A_L$ and decrementing variable c. Step 147 is then repeated. When the result of step 147 becomes false, $A_L$ is taken as the length of the horizontal edge of the lower neighboring right angle.

Figure 11:
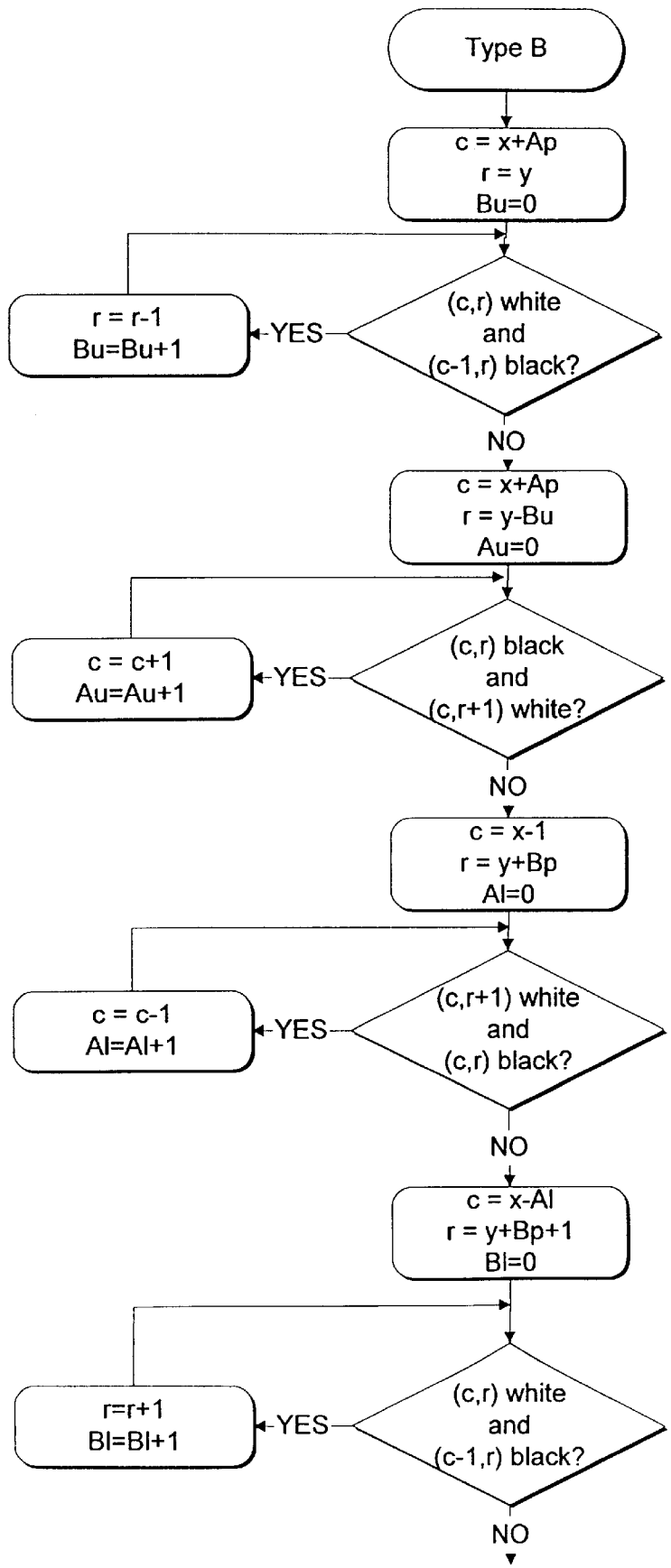
Figure 12:
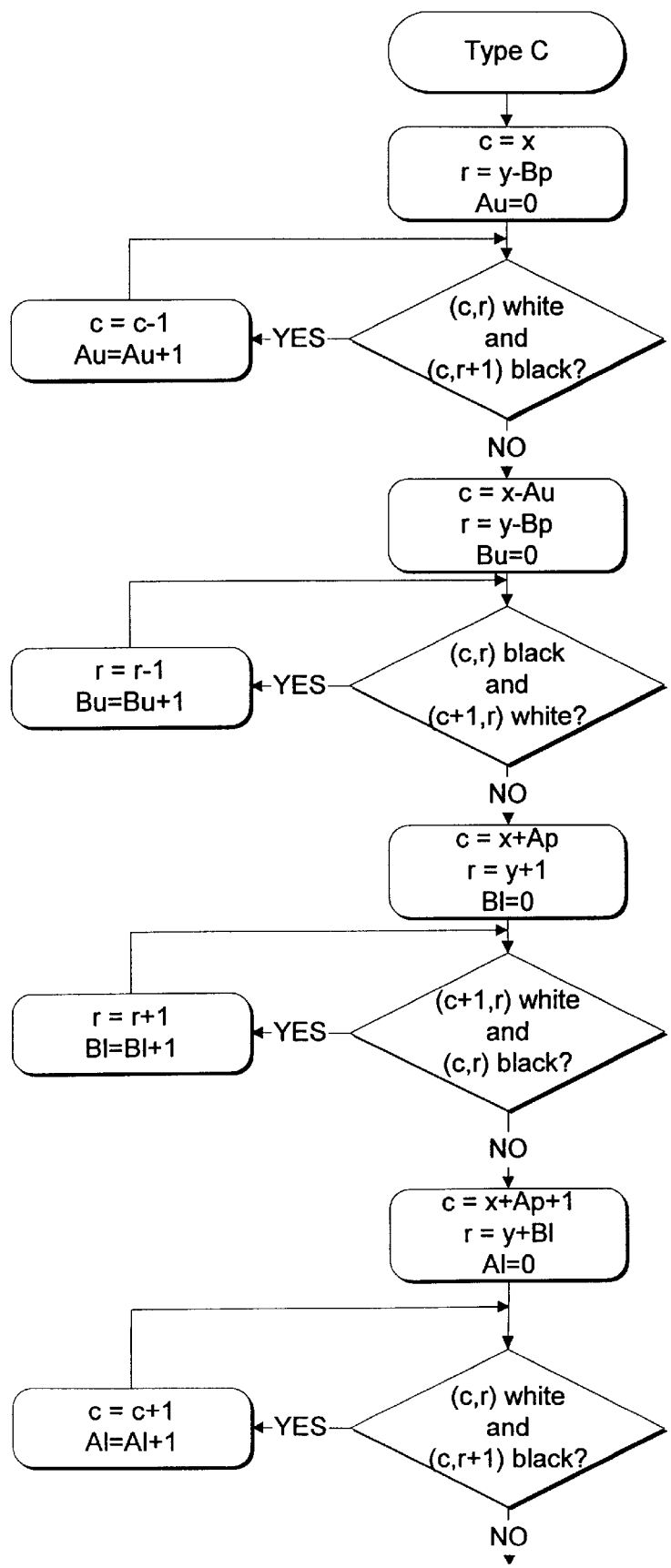
Figure 13:
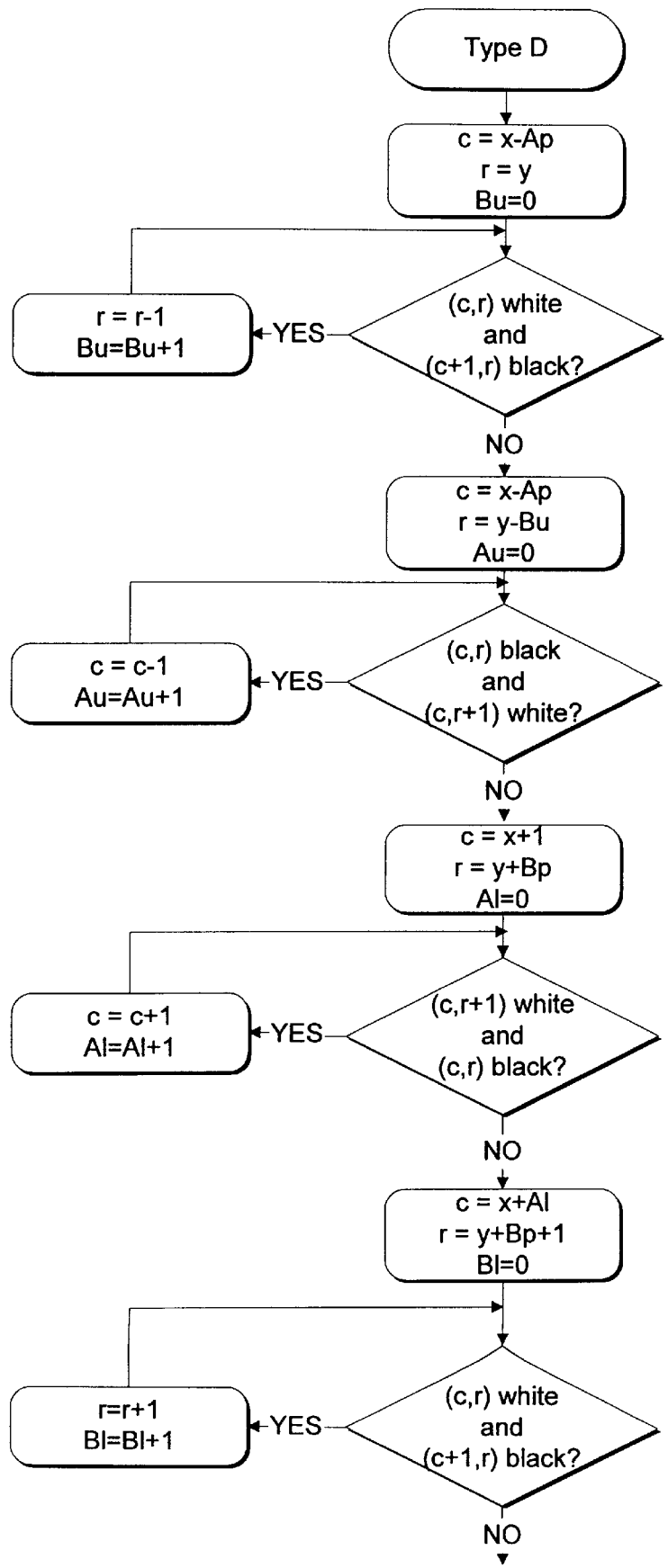

FIGS. 11, 12, and 13 illustrate similar steps for determining $A_U$, $B_U$, $A_L$, and $B_L$ for Type B, Type C, and Type D primary right angles, respectively.

After determining the lengths of neighboring right angles, a step 150 (FIG. 1) is performed of choosing whether to smooth the right angle in the enlarged pattern that corresponds to the primary acute right angle of the reference pattern. This decision is based on the horizontal and vertical edge lengths $A_P$ and $B_P$ of the primary acute right angle, and also on the horizontal and vertical edge lengths $A_U$, $A_L$, $B_U$, and $B_L$ of the upper and lower neighboring right angles. A step 152 of smoothing the right angle in the enlarged pattern is executed only if $A_P$, $A_U$, $A_L$, $B_P$, $B_U$, and $B_L$ are within prescribed limits.

More specifically, the smoothing step is executed only if the edge lengths $A_P$ and $B_P$ of the primary acute angle are less than predetermined values. Even more specifically, step 152 is performed only if one of the following conditions is true:

- the length $A_P$ of the horizontal edge of the primary acute right angle in the reference pattern is one pixel;
- the length $B_P$ of the vertical edge of the primary acute right angle in the reference pattern is one pixel
- the length $A_P$ of the horizontal edge of the primary acute right angle is two pixels and the length $B_P$ of the vertical edge of the primary acute right angle is three pixels; or
- the length $B_P$ of the vertical edge of the primary acute right angle is two pixels and the $A_P$ length of the horizontal edge of the primary acute right angle is two pixels.

Execution of step 152 is further qualified in step 150 by limits on the values of the edge lengths $A_U$, $A_L$, $B_U$, and $B_L$ of the neighboring right angles in the reference pattern. Specifically, step 152 is executed only if the horizontal and vertical edge lengths of each neighboring right angle are within prescribe limits relative to $A_P$ and $B_P$.

General processing steps have been described above. Such steps are sufficient for practicing the invention. In addition, however, there are several processing exceptions that can be implemented to improve results. These exceptions will be discussed below.

Listing 1 below shows pseudo code to perform step 150 for a Type A right angle. The code includes several procedures that will be explained below to implement exceptions and smoothing steps.

```
/* Process Vertical Angle */
if (B_P >= A_P)
{
    if(A_P == 1 || (A_P == 2 && B_P <=3))
    {
        Check_Special_Structure(1);
        Check_Cross_And_Recalculate(1,UpSide);
        if(A_U <= 3) To_Smooth = V_SMOOTH(B_P,B_U);
        if(!To_Smooth)
        {
```

```
            if(A_L <= 3) To_Smooth = V_SMOOTH(B_P,B_L);
            if(!To_Smooth)
            {
                Check_Cross_And_Recalculate(1,DownSide);
                To_Smooth = V_SMOOTH(B_P, B_L);
            }
          }
        }
    }
}
/* Process Horizontal Angle */
if(B_P<A_P || (B_P==A_P && !To_Smooth))
{
    if(B_P==1 || (B_P==2 && A_P<=2))
    {
        if(A_U>0 && B_U==0)
        {
            if(A_L>0 && B_L>0 && BP<=3) To_Smooth = H_SMOOTH(A_P, A_U);
            if(!To_Smooth) Check_Special_Structure(3);
        }
        if(!To_Smooth)
        {
            if(B_U<=3) To_Smooth = H_SMOOTH(A_P,A_U);
            if(!To_Smooth)
            {
                if(B_L<=3) To_Smooth = H_SMOOTH(A_P,A_L);
                if(!To_Smooth)Check_Special_Structure(6);
            }
        }
    }
    if(!To_Smooth && A_P<=3) Check_Cross_And_Recalculate(1,UpSide);
}
if(To_Smooth) DO_SMOOTH;
                                Listing 1
```

In the above code, the variable To_Smooth is set "true" whenever a test indicates that the current primary right angle is to be smoothed. The procedure DO_SMOOTH performs the actual smoothing if To_Smooth has been set in response to the various tests.

Listing 2 shows pseudo code to perform step 150 for a Type B right angle:

```
Check_Cross_And_Recalculate(2,Current);
Check_Cross_And_Recalculate(2,UpSide);
Check_Cross_And_Recalculate(2,DownSide);
/* Process Vertical Angle*/
if(B_P >= A_P)
{
    if(A_P==1 || (A_P==2 && B_P<=3))
    {
        Check_Special_Structure(3);
        if(!To_Smooth)
        {
            if(A_U<=3) To_Smooth = V_SMOOTH(B_P,B_U);
            if(!To_Smooth) Check_Special_Structure(3);
        }
        if(!To_Smooth)
        {
            if(A_L <= 3) To_Smooth = V_SMOOTH(B_P,B_L);
            if(!To_Smooth) Check_Special_Structure(6);
        }
    }
}
/* Process Horizontal Angle*/
if(B_P<A_P || (B_P==A_P && !To_Smooth)
{
    if(B_P==1 || (B_P==2 && A_P <= 2))
    {
        if(B_P==1 || (B_P==2 && A_P<=2))
        {
            if(A_U==0 && B_U==0 && B_L==0)Check_Special_Structure(4);
        }
        else
        {
            if(B_U <=3) To_Smooth = H_SMOOTH(A_P,A_U);
```

```
            if(!To_Smooth)
            {
                if(B_L<=3) To_Smooth = H_SMOOTH(A_P,A_L);
                if(!To_Smooth) Check_Special_Structure(6);
            }
        }
    }
}
if(To_Smooth) DO_SMOOTH;
```
Listing 2

Listing 3 shows pseudo code to perform step 150 for a Type C right angle:

```
/* Process Vertical Angle*/
if(B_P>=A_P)
{
    if(A_P==1 || (A_P==2 && B_P<=3))
    {
        if(A_U<=3) To_Smooth = V_SMOOTH(B_P,B_U);
        if(!To_Smooth)
        {
            if(A_L<=3) To_Smooth = V_SMOOTH(B_P,B_L);
            if(!To_Smooth) Check_Special_Structure(6);
            if(To_Smooth && A_P==2 && B_P==3) A=1;
        }
    }
}
/* Process Horizontal Angle*/
if(B_P<A_P || (B_P==A_P && !To_Smooth)
{
    if(B_P==1 || (B_P==2 && A_P <= 2))
    {
        Check_Special_Structure(2);
        if(B_U<=3) To_Smooth = H_SMOOTH(A_P,A_U);
        if(!To_Smooth)
        {
            if(B_L<=3) To_Smooth = H_SMOOTH(A_P,A_L);
            if(!To_Smooth) Check_Special_Structure(6);
        }
    }
}
if(To_Smooth) DO_SMOOTH;
```
Listing 3

Listing 4 below shows pseudo code to perform step 150 for a Type D right angle:

```
/* Process Vertical Angle */
if (B_P >= A_P)
{
    if(A_P == 1 || (A_P == 2 && B_P <=3))
    {
        if(A_U <= 3) To_Smooth = V_SMOOTH(B_P,B_U);
        if(To_Smooth)Check_Special_Structure(2);
        if(!To_Smooth)
        {
            if(A_L <= 3) To_Smooth = V_SMOOTH(B_P,B_L);
            if(!To_Smooth) Check_Special_Structure(6);
        {
        if(To_Smooth && A_P==2 && B_P==3) A_P=1;
        if(!To_Smooth) Check_Special_Structure(2);
        }
    }
}
/* Process Horizontal Angle */
if(B_P<A_P || (B_P==A_P && !To_Smooth))
{
    if(B_P==1 || (B_P==2 && A_P<=2))
    {
        if(B_L==0 && A_U==0 && B_U == 0) Check_Special_Structure(5);
        else
        {
            if(B_U<=3) To_Smooth = H_SMOOTH(A_P,A_U);
            if(!To_Smooth)
            {
                if(B_L<=3) To_Smooth = H_SMOOTH(A_P,A_L);
                if(!To_Smooth)Check_Special_Structure(6);
            }
        }
    }
}
if(To_Smooth) DO_SMOOTH;
```
Listing 4

Listing 5 shows subroutines H_SMOOTH and V_SMOOTH. Generally, these subroutines check to make sure that the horizontal and vertical edge lengths of neighboring right angles are within prescribed limits relative to those of the primary right angle. H_SMOOTH is called from the procedures above to check the relationships between the horizontal edges of the primary right angle and its neighboring right angles. V_SMOOTH is called to check the relationships between the vertical edges of the primary right angle and its neighboring right angles. Each of these subroutines returns a 1 (corresponding to "true") if the primary angle should be smoothed, and a 0 (corresponding to "false") if the angle should not be smoothed.

```
H_SMOOTH(a,b)
{
    if(a==b) return(1);
    if(a<b) exchange(a,b);
    if((a-b)<3)              return (1);
    if(a>6 && (a-b)<4)       return (1);
    if(a>8 && (a-b)<6)       return (1);
    if(a>13 && (a-b)<8)      return (1);
    return (0);
}
V_SMOOTH(a,b)
{
    if(a==b) return(1);
    if(a<b) exchange(a,b);
    if((a-b)<3)              return (1);
    if(a>5 && (a-b)<4)       return (1);
    if(a>8 && (a-b)<6)       return (1);
    if(a>10 && (a-b)<7)      return (1);
    if(a>15 && (a-b)<8)      return (1);
    return (0);
}
                           Listing 5
```

Figure 14B:
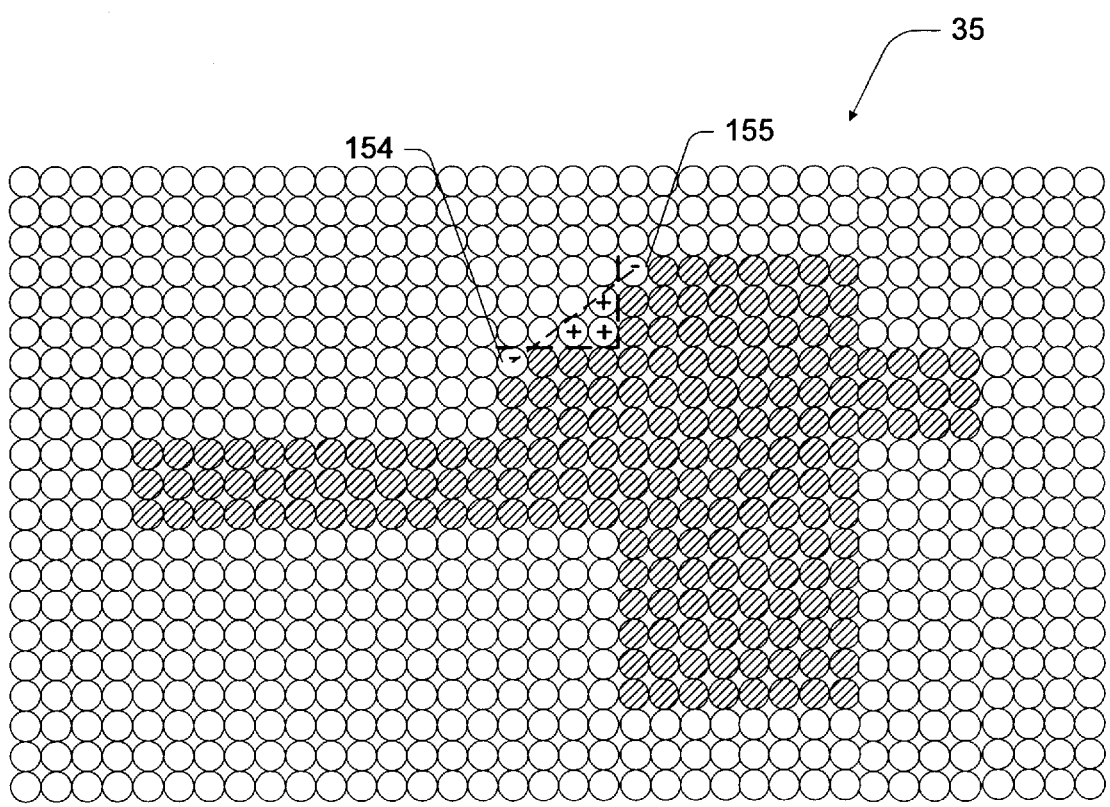
FIG. 14B illustrates the results of smoothing a right angle in an enlarged pixel pattern such as the one illustrated in FIG. 3.

The results of smoothing the right angle of FIG. 3 are shown in FIG. 14B. Smoothing step 152 potentially includes both deleting and adding pixels from the enlarged pattern. Only two pixels are potentially deleted: those at the outer ends of the horizontal and vertical edges of the right angle in the enlarged pattern. In the example of FIG. 14B, these are pixels 154 and 155. However, these pixels are only deleted if the lengths of the corresponding edges are greater than predetermined values. In the preferred embodiment, the pixel at the outer end of the vertical edge is deleted only if the length of the vertical edge (measured in Y' coordinates) is greater than two. The pixel at the outer end of the horizontal edge is deleted only if the length of horizontal edge (again measured in X' coordinates) is greater than two. In the example of FIG. 14B, both of pixels 154 and 155 are deleted.

Pixels are added to fill in positions within a triangle formed by the right angle in the enlarged pattern. FIG. 14B shows a line that has been constructed between the centers of pixels 154 and 155. This line completes a triangle in conjunction with the horizontal and vertical edges of the right angle. Any pixel whose center is within this area is added to the enlarged pattern. Added pixels are identified with a "+" symbol.

The listings above contain numerous calls to subroutines named Check_Cross_And_Recalculate and Check_Special_Structure. These routines implement exceptions to the processing steps described above, after detecting special character structures that do not respond well to such processing steps. Check_Cross_And_Recalculate detects certain character structures having a cross, in which, for instance, the vertical edge length B of an angle should actually be viewed as extending upward, through the cross.

Figure 15:
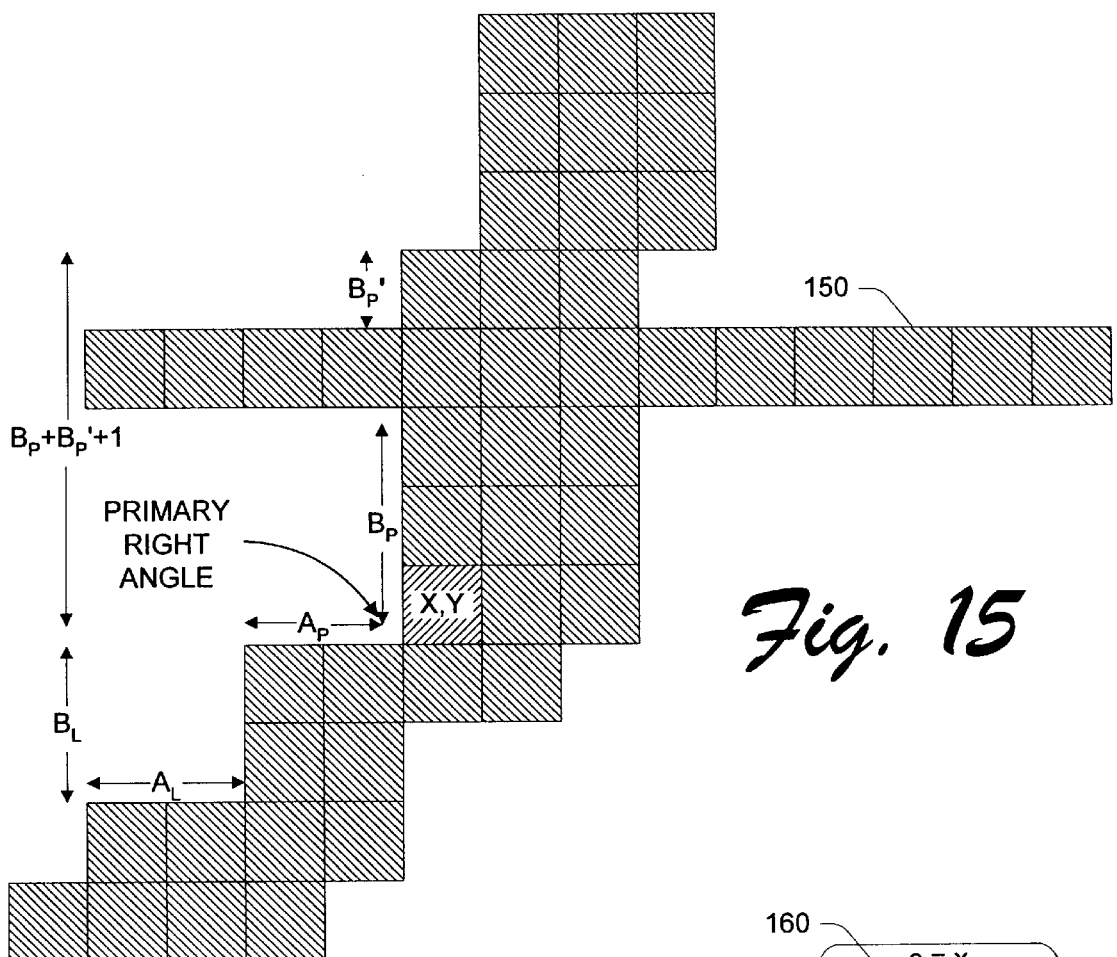
FIG. 15 shows a cross structure that is handled as an exception to normal processing steps.

FIG. 15 illustrates this situation, showing a structure having a horizontal cross 150 that is one pixel in height. While the general processing steps above yield a vertical edge length of $B_P$, the structure would be more effectively smoothed if the edge length were taken as $B_P+B_P'+1$, where $B_P'$ is the length of the vertical edge above the cross as shown in FIG. 15.

There are several variations of Check_Cross_And_Recalculate. Two variations are performed for Type A right angles. The first of these variations is performed in response to arguments (1, UpSide). This variation checks for the following condition: ($B_L>=2$ OR $B_L>=A_L$) AND ($A_U=0$ AND $B_U=0$). This condition is true with regard to the primary right angle illustrated in FIG. 15.

Figure 16:
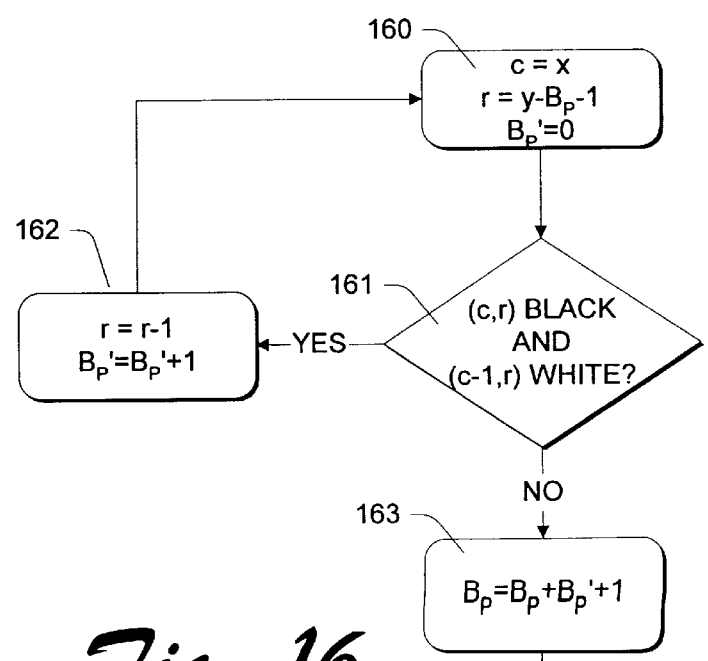
FIG. 16 shows steps that are performed in response to a cross structure such as that shown in FIG. 15.

FIG. 16 illustrates the steps that are performed if this condition is met. A first step 160 comprises setting a column variable c to x, and a row variable r to the value y–$B_P$–1. A variable $B_P'$, is initialized to zero. Step 161 comprises checking whether the pixel at position (c,r) is black, and whether the pixel at position (c–1,r) is white. If both of these conditions are true, step 162 is executed of incrementing $B_P'$ and decrementing variable r. Step 161 is then repeated. When the result of step 161 becomes false, a step 163 is performed of incrementing $B_P$ by $B_P'+1$: $B_P=B_P+B_P'+1$.

Figure 17:
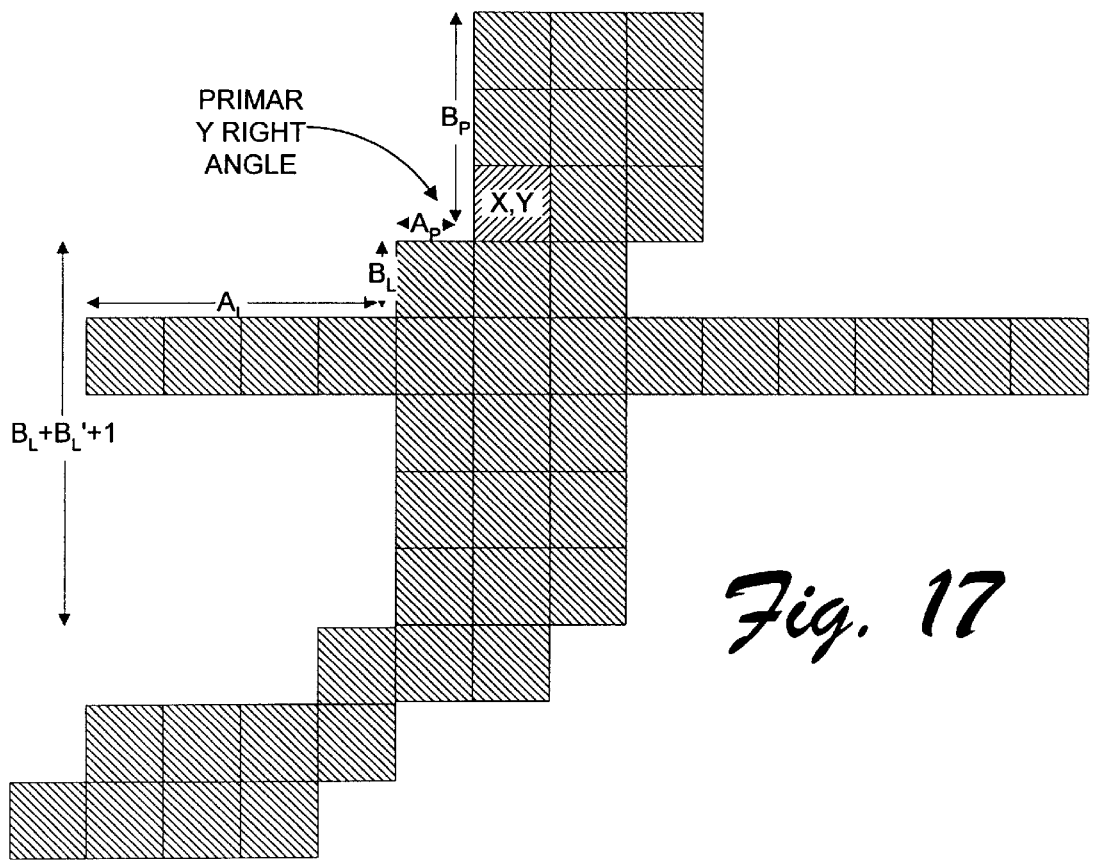
FIG. 17 shows another cross structure that is handled as an exception to normal processing steps.
Figure 18:
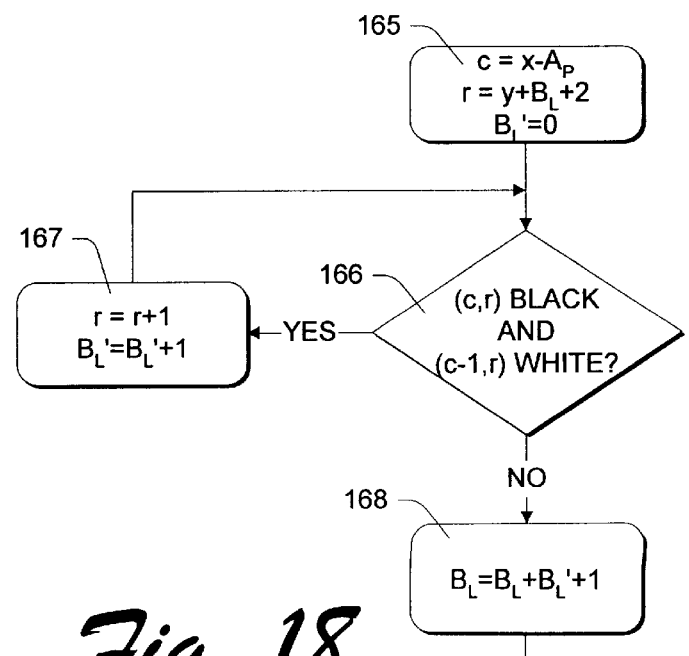
FIG. 18 shows steps that are performed in response to a cross structure such as than shown in FIG. 17.

The second Type A variation of Check_Cross_And_Recalculate is performed in response to arguments (1, DownSide). This variation checks for the following condition: $A_L>B_L$. This condition is true with regard to the primary right angle illustrated in FIG. 17. FIG. 18 illustrates the steps that are performed if this condition is met. A first step 165 comprises setting a column variable c to x–$A_P$, and a row variable r to the value y+$B_L$+2. A variable $B_L'$, is initialized to zero. Step 166 comprises checking whether the pixel at position (c,r) is black, and whether the pixel at position (c–1,r) is white. If both of these conditions are true, step 167 is executed of incrementing $B_L'$ and incrementing variable r. Step 166 is then repeated. When the result of step 166 becomes false, a step 168 is performed of incrementing $B_L$ by $B_L'+1$.

There are three versions of Check_Cross_And_Recalculate that are used for Type B right angles. The first of these variations is performed in response to arguments (2, Current). This variation checks for the following condition: ($B_P<=8$) and the dots at locations (x,y+$B_P$+1) and (y+1,y+$B_P$+1) are black. This condition is true with regard to the primary right angle illustrated in FIG. 19. FIG. 20 illustrates the steps that are performed if this condition is met. A first step 195 comprises setting a column variable c to x, and a row variable r to the value y+$B_P$+2. A variable $B_P'$, is initialized to zero. Step 196 comprises checking whether the pixel at position (c–1,r) is black, and whether the pixel at position (c,r) is white. If both of these conditions are true, step 197 is executed of incrementing $B_P'$ and incrementing variable r. Step 196 is then repeated. When the result of step 196 becomes false, a step 198 is performed of incrementing $B_P$ by $B_P'+1$.

Another variation of Check_Cross_And_Recalculate is performed in response to arguments (2, UpSide). This variation checks for the following condition: $A_P>2$ and $B_P>0$. This condition is true with regard to the primary right to angle illustrated in FIG. 21.

Figures 21, 22:
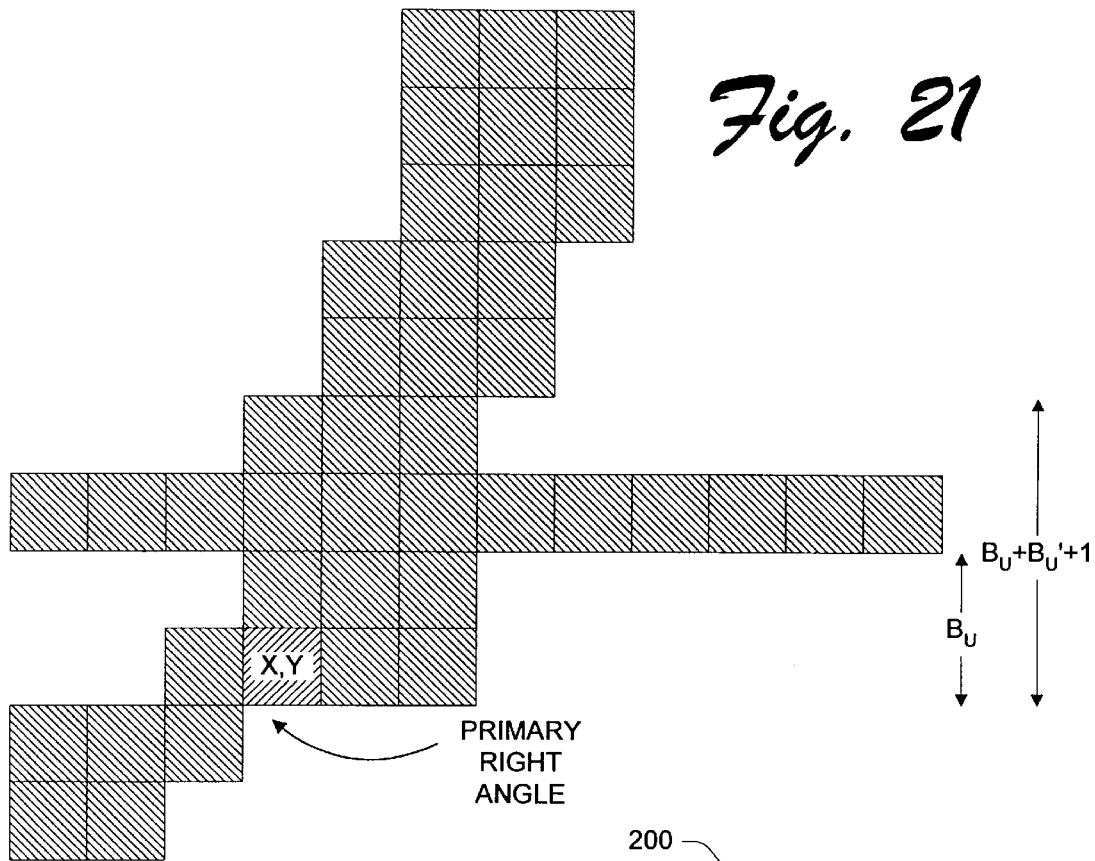
FIG. 21 shows another cross structure that is handled as an exception to normal processing steps.
FIG. 22 shows steps that are performed in response to a cross structure such as than shown in FIG. 21.

FIG. 22 illustrates the steps that are performed if this condition is met. A first step 200 comprises setting a column variable c to x+$A_P$, and a row variable r to the value y–$B_U$–1. A variable $B_U'$, is initialized to zero. Step 201 comprises checking whether the pixel at position (c–1,r) is black, and whether the pixel at position (c,r) is white. If both of these conditions are true, step 202 is executed of incrementing $B_U'$ and decrementing variable r. Step 201 is then repeated. When the result of step 201 becomes false, a step 203 is performed of incrementing $B_U$ by $B_U'+1$: $B_U=B_U+B_U'+1$.

Figure 23:
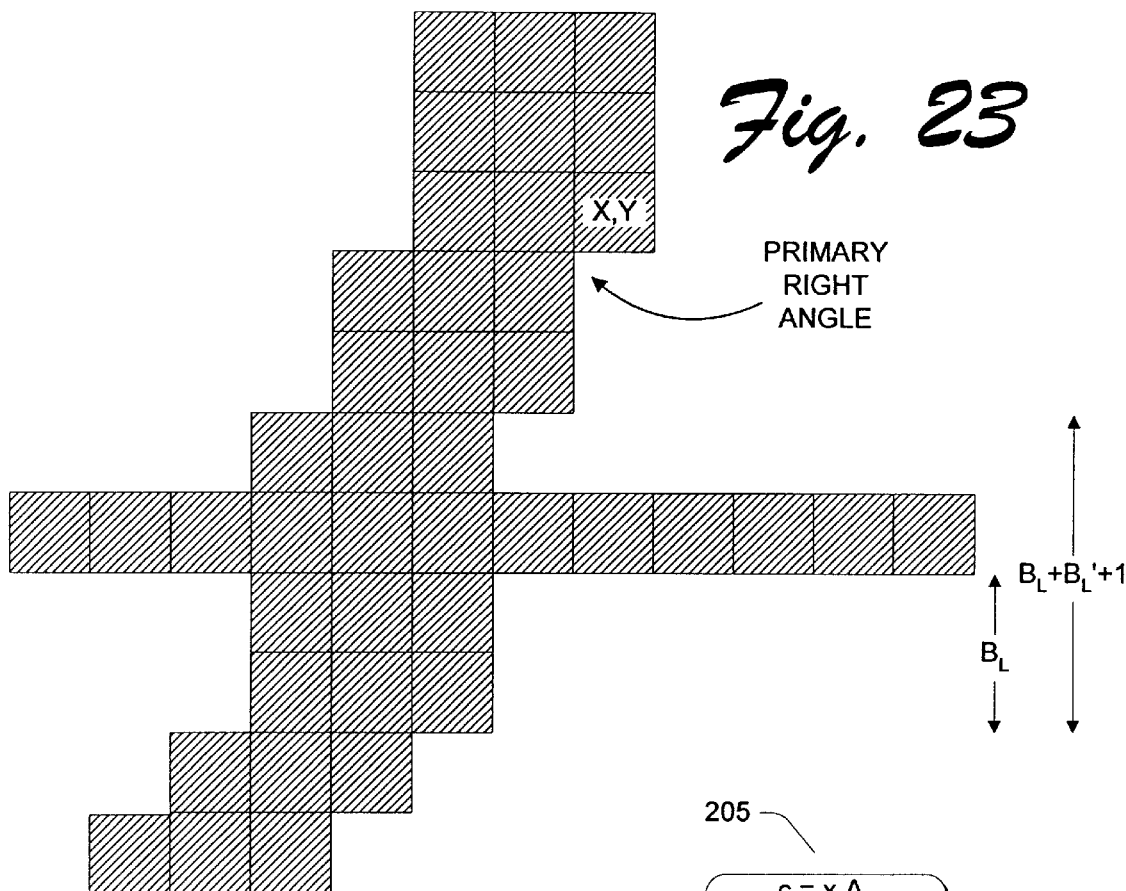
FIG. 23 shows another cross structure that is handled as an exception to normal processing steps.
Figure 24:
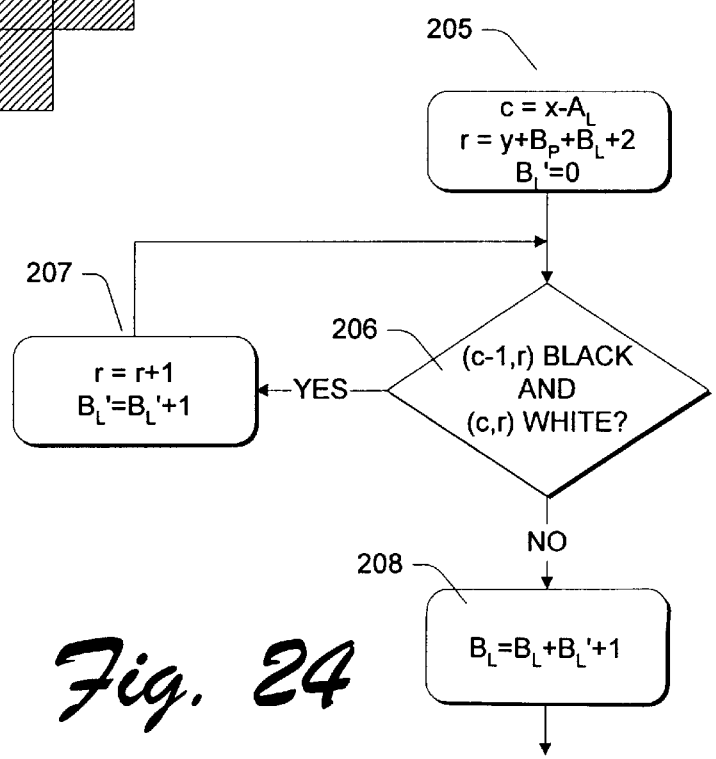
FIG. 24 shows steps that are performed in response to a cross structure such as than shown in FIG. 23.

The last Type B variation of Check_Cross_And_Recalculate is performed in response to arguments (2, DownSide). This variation checks for the following condition: ($B_L>=0$) and the dots at locations ($x-A_L,y+B_P+B_L+1$) and $x-A_L+1,y+B_P+B_L+1$) are black. This condition is true with regard to the primary right angle illustrated in FIG. 23. FIG. 24 illustrates the steps that are performed if this condition is met. A first step 205 comprises setting a column variable c to $x-A_L$, and a row variable r to the value $y+B_P+B_L+2$. A variable $B_L'$, is initialized to zero. Step 206 comprises checking whether the pixel at position (c−1,r) is black, and whether the pixel at position (c,r) is white. If both of these conditions are true, step 207 is executed of incrementing $B_L'$ and incrementing variable r. Step 206 is then repeated. When the result of step 206 becomes false, a step 208 is performed of incrementing $B_L$ by $B_L'+1$.

Subroutine Check_Special_Structure checks for 6 different types of characters or right angles that require special processing, depending on the argument supplied with the subroutine call. In response to different conditions, Check_Special_Structure removes dots, changes angle parameters, and/or changes the current dot position.

Figure 25:
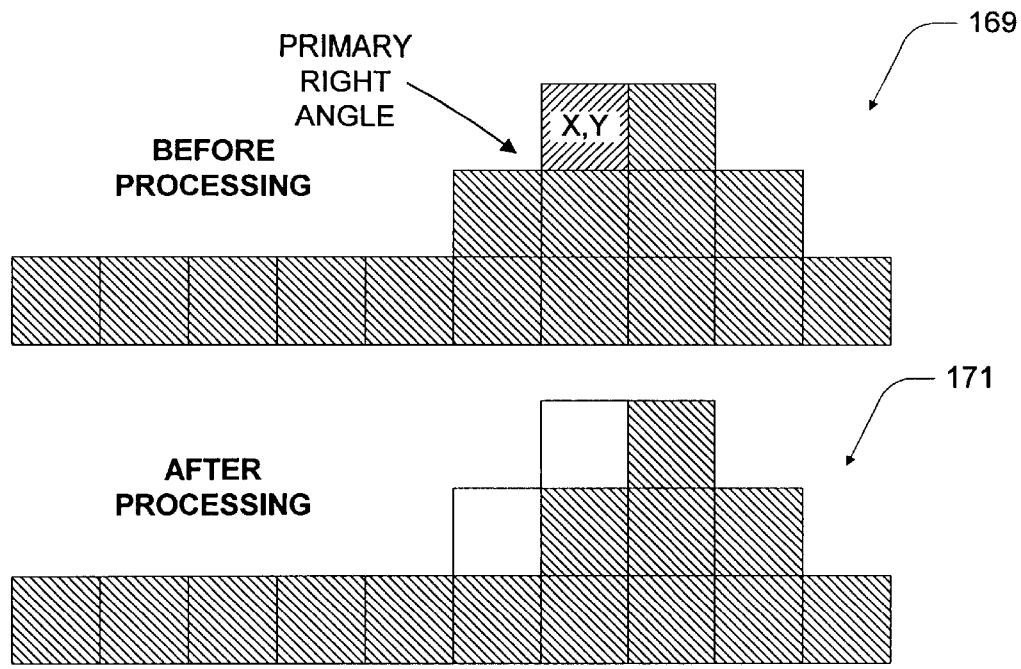
Figure 26:
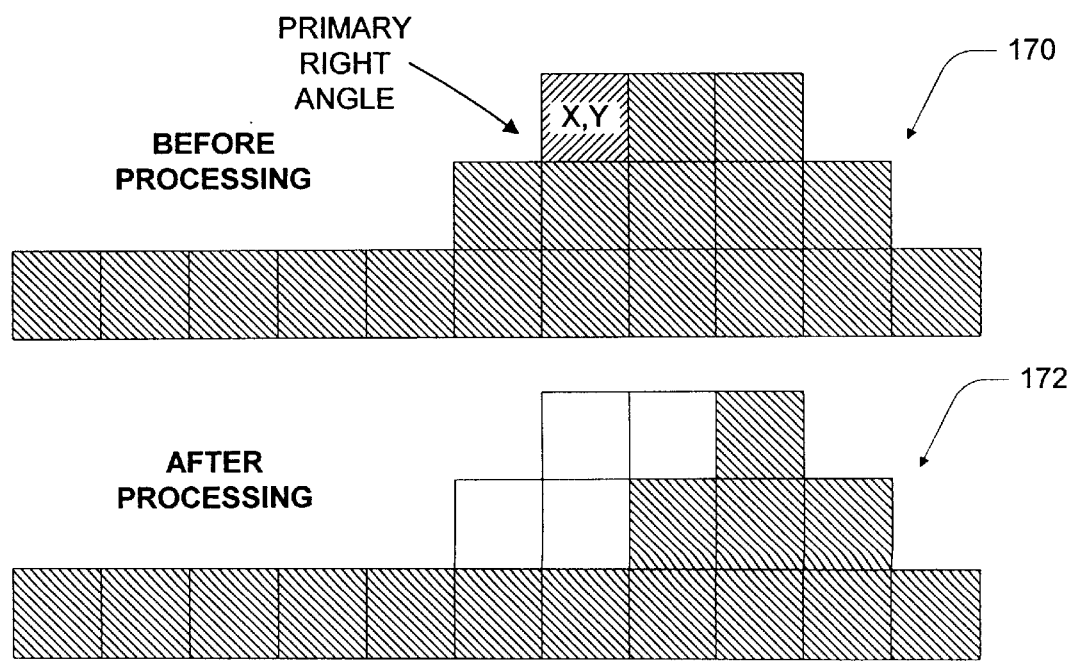

FIGS. 25 and 26 illustrate two variations of a special structure of type 1. This special structure is present when the following conditions are met: $A_P=1$ AND $B_P=1$ AND $B_U=0$ AND ($A_U=2$ OR $A_U=3$). These conditions are met in the upper structure 169 of FIG. 25, where $A_U=2$, and in the upper structure 170 of FIG. 26, where $A_U=3$. In this and the following examples, unprocessed black or printed dots are represented by hatched squares. The current dot, at position (x,y), is indicated by the label X,Y. Dots that are removed by the processing steps of Check_Special_Structure are represented by open or white squares.

In FIG. 25, where $A_U=2$, Check_Special_Structure removes two dots: (x,y) and (x−1,y+1). In addition, the current dot position is moved one dot to the right, to (x+1,y). In other words, x is incremented by one before further processing occurs. The resulting structure is indicated in FIG. 25 by reference numeral 171. In FIG. 26, where $A_U=3$, four dots are removed: (x,y) (x−1,y+1), (x+1,y) and (x,y+1). In addition, the current dot position is moved two dots to the right, to (x+2,y). In other words, x is incremented by two before further processing occurs. The resulting structure is indicated in FIG. 26 by reference numeral 172. In both cases, the variable To_Smooth is set to 1 or true.

Figure 27:
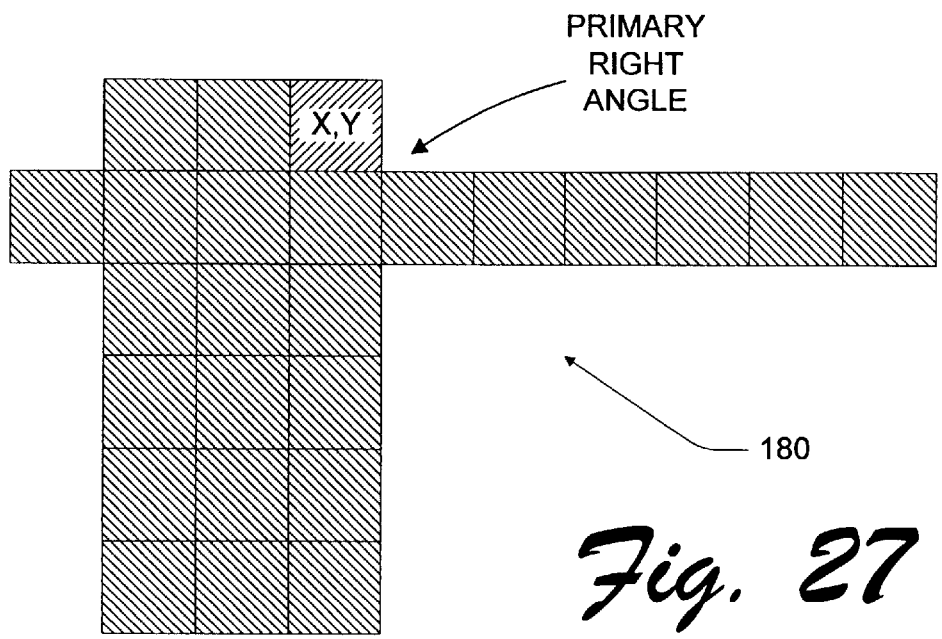
Figure 28:
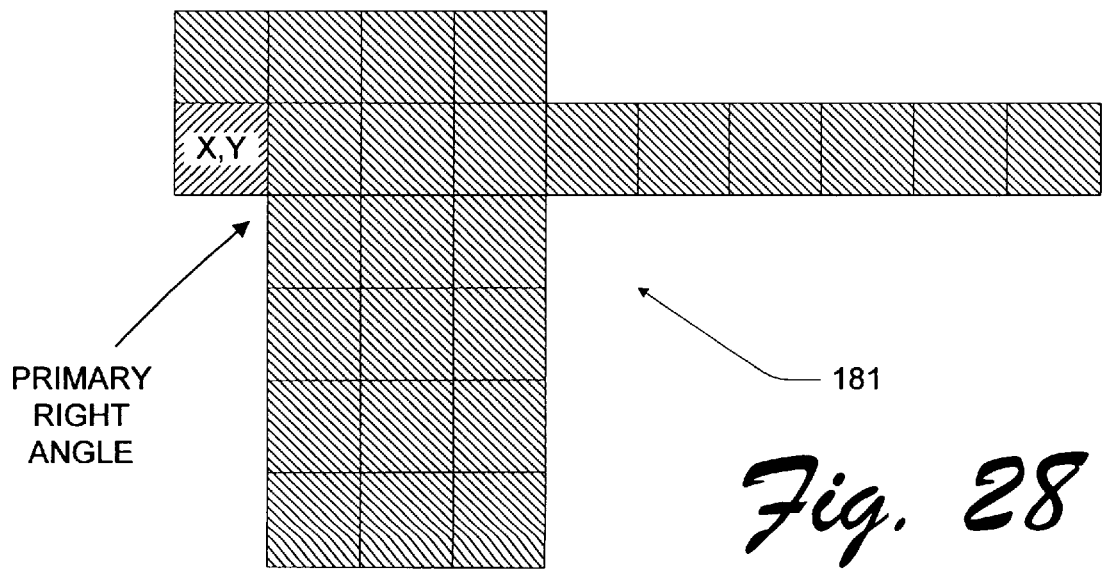

FIGS. 27 and 28 illustrate two variations 180 and 181 of a special structure of type 2. The first variation 180 of this special structure, illustrated in FIG. 27, is present when the following conditions are met: $B_U=0$ AND $B_L=0$ AND $A_L=0$. The second variation 181 of this special structure, illustrated in FIG. 28, is present when the dot at position (x−1, y+1) is white and the following additional conditions are met: $A_U=0$ AND ($B_U=1$ OR $B_U=2$). In either case, the only special processing performed is to set To_Smooth to false or zero.

FIGS. 29 and 30 illustrate two variations of a special structure of type 3. The type 3 special structure is present detected only in conjunction with type A and type B right angles. FIG. 29 illustrates the situation where a type 3 special structure 183 is found in combination with a type A primary right angle having coordinates (x,y). To detect this situation, it is first necessary to identify whether there is a type C right angle at dot position ($x-1+A_U,y$). This condition is determined using steps 10 discussed above in conjunction with FIG. 4. If no such right angle exists, the primary right angle is not identified as a special structure. If a type C right angle does exist, its edge lengths are calculated using the steps of FIG. 8. These edge lengths will be referred to as $A_C$ and $B_C$.

Using $A_C$ and $B_C$, a type 3 special structure is determined to exist if the following conditions are met:

the dot at position ($x+A_U-1+A_C,y+B_C-1$) is black; AND the dot at position ($x+A_U-1+A_C+1,y+B_C-1$) is white; AND the dot at position ($x+A_U-1+A_C,y+B_C$) is black; AND the dot at position ($x+A_U-1+A_C+1,y+B_C$) is white; AND the dot at position ($x+A_U-1+A_C,y+B_C+1$) is white; AND the dot at position ($x+A_U-1+A_C+1,y+B_C+1$) is white.

If these conditions are all true, as they are in the example of FIG. 29, the dots at positions (xy) and (x+2,y) are set to white. In addition, the current dot position is incremented by one dot in the x direction, to (x+1,y). A resulting structure 184 is shown in FIG. 29.

FIG. 30 illustrates the situation where a type 3 special structure 185 is found in combination with a type B primary right angle having coordinates (x,y). This situation exists only if $A_U=0$ and $B_U=0$. If both $A_U$ and $B_U$ are zero, a type C right angle exists. The horizontal edge length $A_C$ of this type C right angle is determined by inspecting vertically adjacent dots in rows y−1 and y−2, moving from right to left. The vertical edge length $B_C$ of the type C right angle is determined by inspecting horizontally adjacent dots in columns $x-A_C$ and $x-A_C+1$. A type 3 special structure is determined to exist in this case if the following conditions are met: $B_C=1$ AND ($A_C=1$ OR $A_C=2$). If these conditions are true, the dot at position (x,y) is set to white and $B_P$ of the primary right angle is set to 1. In addition, the current dot position is decremented by one dot in the y direction, to (x,y−1). In this case, the original value of y is restored after the smoothing step is completed. A resulting structure 186 is shown in FIG. 30.

Figure 31:
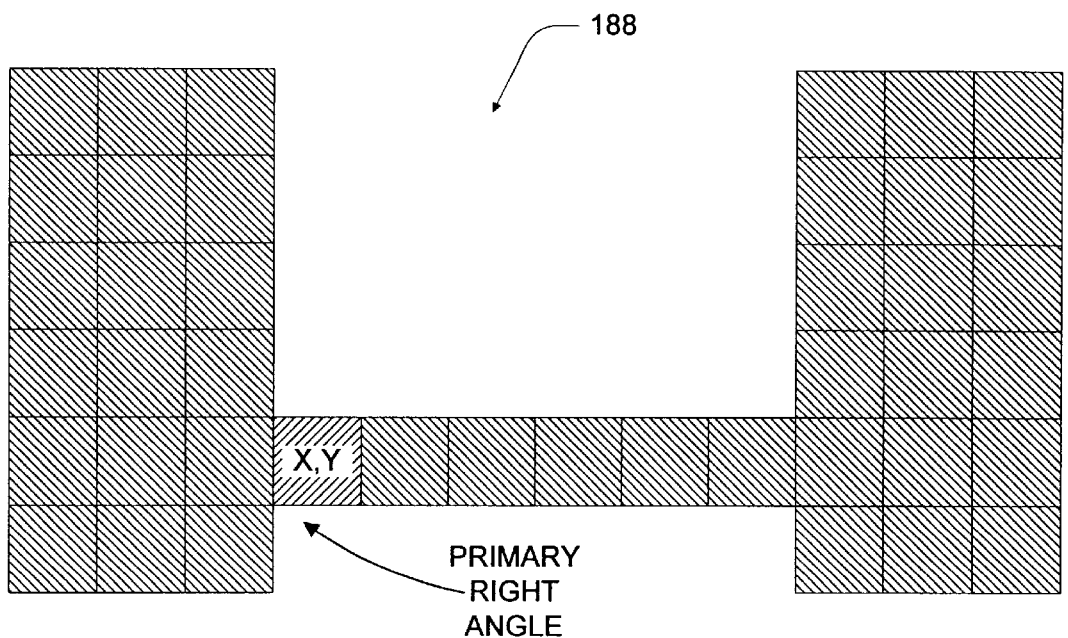

FIG. 31 illustrates a type 4 special structure 188. A type 4 special structure exists if the primary right angle is of type B; $B_L=0$; $A_U=0$; and $B_U=0$; and the dot at location (x,y−1) is white. When this special structure is found, $A_P$ is set to 1.

Figure 32:
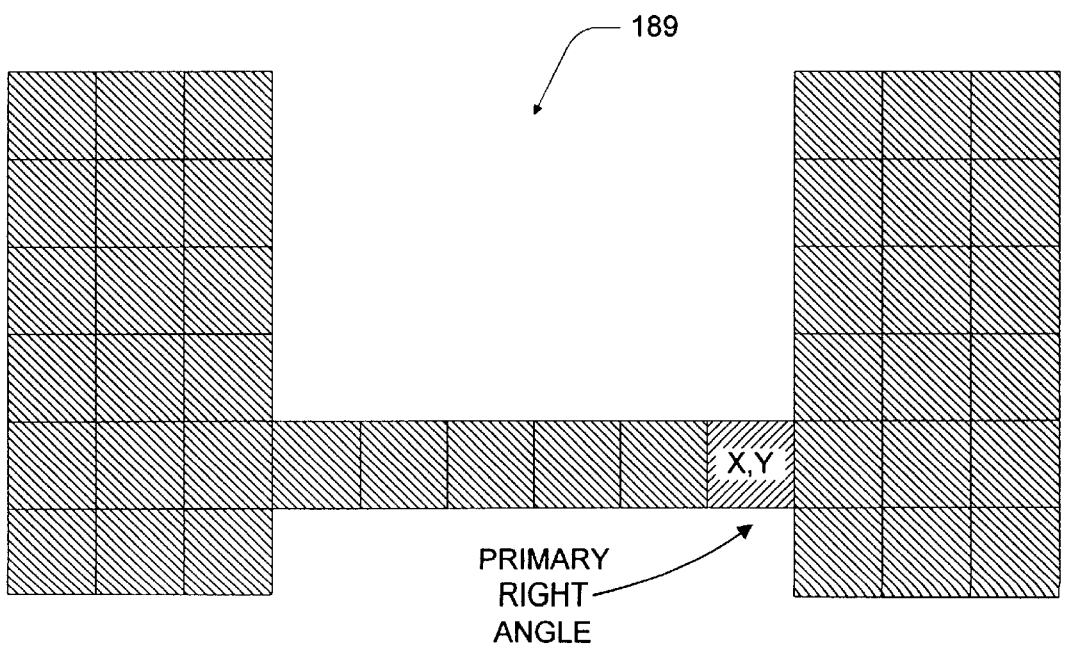

FIG. 32 illustrates a type 5 special structure 189. A type 5 special structure exists if the primary right angle is of type D; $B_L=0$; $A_U=0$; and $B_U=0$; and the dot at location (x,y−1) is white. When this special structure is found, $A_P$ is set to 1.

Figure 33:
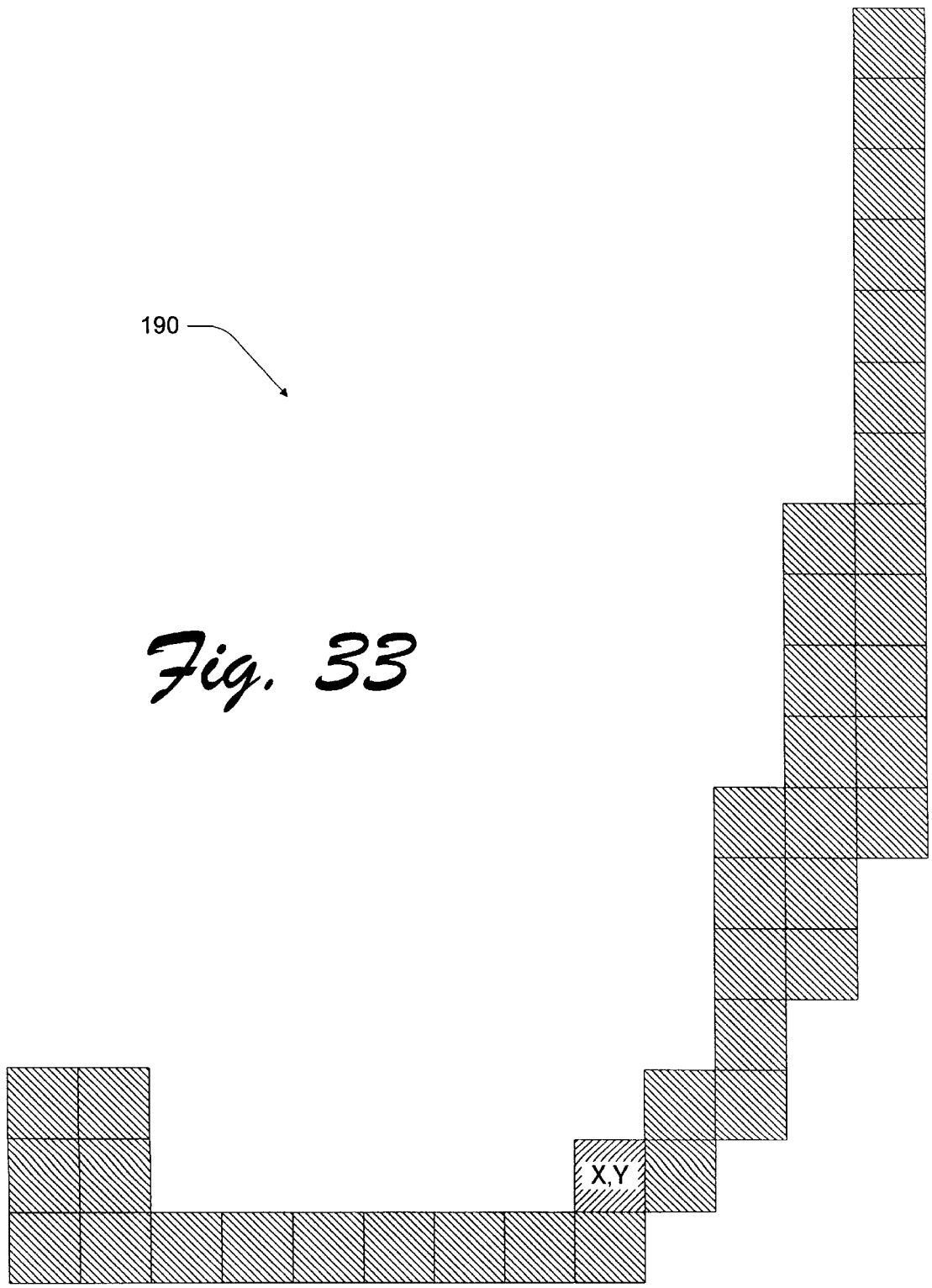

The last special structure, referred to as a type 6 special structure, occurs in the "feather" of many ASCII and Japanese characters, where a curve changes from vertical to horizontal or from horizontal to vertical. FIG. 33 shows this situation for a Type A right angle. In practice, there is a unique process for each type of primary right angle. Each such process involves a vertical procedure and a horizontal procedure. The vertical procedure is executed first.

Following is the process for a Type A right angle:

if ($A_U > 0$)

if ($B > B_L + B_L$)

$B = B_L + 1$ else if ($B > B_L$)

$B = B_L$

-continued
```
if (A_L=0 AND B_L=0 AND To_Smooth = False)
    if (A>A_U+A_U)
        A=A_U
    else if (A>A_U)
        A=A-1
```

The process is similar for Type B, C, and D right angles. For a type B right angle, for example, the following process is performed:

```
if (A_U >0)
    if (B>B_U+B_U)
        B=B_U+1
    else if (B>B_U)
        B=B_U if (A_U =0 AND B_U=0)
    if (A>A_L+A_L)
        A=A_L
    else if (A>A_L)
        A=A_L-1
```

For a type C right angle, the following process is performed:

```
if (A_L>0)
    if (A>A_L+A_L)
        A=A_L+1
    else if (A>A_L)
        A=A_L if (B_U>0 AND A_L=0 AND B_L=0)
    if (A>A_U+A_U)
        A=A_U
    else if (A>A_U+1)
        A=A_U-1
```

For a type D right angle, the following process is performed:

```
if (A_U >0)
    if (B>B_U+B_U)
        B=B_U+1
    else if (B>B_U)
        B=B_U if (A_U =0 AND B_U=0)
    if (A>A_L+A_L)
        A=A_L
    else if (A>A_L)
        A=A_L-1
```

The invention is particularly useful in enlarging Chinese and Kanji character sets, although the general principles are applicable when enlarging a variety of different characters. A particular advantage is the ability to handle arbitrary scaling factors, which can be specified independently in both axes. Other enlargement schemes have limits on the possible values of X and Y scaling factors. Another advantage is that that invention avoids the use of lookup tables, thus reducing memory overhead.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of enlarging a character that is represented by a first pattern of pixels, comprising the following steps:
    converting pixels of the first pattern to corresponding rectangles of pixels in a second pattern of pixels;
    identifying acute right angles in the first pattern, each such acute right angle having horizontal and vertical edges with corresponding lengths, each acute right angle in the first pattern having a corresponding right angle in the second pattern;
    determining the lengths of the horizontal and vertical edges of the acute right angles in the first pattern;
    choosing whether to smooth a particular right angle in the second pattern based on the lengths of the horizontal and vertical edges of the corresponding acute right angle in the first pattern.

2. A method as recited in claim 1, the method further comprising a step of sequentially checking individual pixels of the first pattern to determine whether they form acute right angles.

3. A met ho d as recited in claim 1, the method further comprising a step of classifing each acute right angle in the first pattern in terms of its orientation prior to determining the lengths of its horizontal and vertical edges.

4. A method as recited in claim 1, the method further comprising a step of classifying each acute right angle in the first pattern according to one of the following orientations prior to determining lengths of the horizontal and vertical edges:
    facing up and left;
    facing down and right;
    facing down and left;
    facing up and right.

5. A method as recited in claim 1, further comprising choosing to smooth said particular right angle in the second pattern only if one of the following conditions is true:

the length of the horizontal edge of the acute right angle in the first pattern is one pixel;

the length of the vertical edge of the acute right angle in the first pattern is one pixel;

the length of the horizontal edge of the acute right angle in the first pattern is two pixels and the length of the vertical edge of the acute right angle in the first pattern is three pixels;

the length of the vertical edge of the acute right angle in the first pattern is two pixels and the length of the horizontal edge of the acute right angle in the first pattern is two pixels.

6. A method as recited in claim 1, further comprising choosing to smooth said particular right angle in the second pattern only if the horizontal and vertical edges of the corresponding acute right angle in the first pattern have lengths that are less than predetermined values.

7. A method as recited in claim 1, further comprising a smoothing step of deleting pixels from the second pattern.

8. A method as recited in claim 1, further comprising a smoothing step of deleting pixels from the second pattern if the horizontal and vertical edges of the corresponding acute right angle in the second pattern have lengths that are greater than predetermined values.

9. A method as recited in claim 1, further comprising a smoothing step of adding pixels to the second pattern.

10. A method as recited in claim 1, further comprising a smoothing step of adding pixels to the second pattern in positions within triangles formed by the right angles in the second pattern.

11. A method of enlarging a character that is represented by a first pattern of pixels, comprising the following steps:

converting pixels of the first pattern to corresponding rectangles of pixels in a second pattern of pixels;

identifying acute right angles in the first pattern, each such acute right angle having horizontal and vertical edges with corresponding lengths, each acute right angle in the first pattern having a corresponding right angle in the second pattern;

determining the lengths of the horizontal and vertical edges of the acute right angles in the first pattern;

for each identified acute right angle in the first pattern, identifying neighboring right angles in the first pattern, the neighboring right angles having horizontal and vertical edges with corresponding lengths;

determining the lengths of the horizontal and vertical edges of the neighboring right angles in the first pattern;

choosing whether to smooth a particular right angle in the second pattern based on the lengths of the horizontal and vertical edges of the corresponding acute right angle in the first pattern and based on the lengths of the horizontal and vertical edges of the neighboring right angles in the first pattern.

12. A method as recited in claim 11, further comprising choosing to smooth said particular right angle in the second pattern only if the horizontal and vertical edges of the corresponding acute right angle in the first pattern have lengths that are less than predetermined values.

13. A method as recited in claim 11, further comprising choosing to smooth said particular right angle in the second pattern only if the horizontal and vertical edges of the neighboring right angles of the corresponding acute right angles in the first pattern have lengths within prescribed limits relative to the lengths of the edges of the corresponding acute right angle in the first pattern.

14. A method as recited in claim 11, further comprising choosing to smooth said particular right angle in the second pattern only if:

the horizontal and vertical edges of the corresponding acute right angle in the first pattern have lengths that are less than predetermined values; and the horizontal and vertical edges of the neighboring right angles of the corresponding acute right angles in the first pattern have lengths within prescribed limits relative to the lengths of the edges of the corresponding acute right angle in the first pattern.

15. A method as recited in claim 11, further comprising a smoothing step of deleting pixels from the second pattern if the horizontal and vertical edges of the corresponding acute right angle in the second pattern have lengths that are greater than predetermined values.

16. A method as recited in claim 11, further comprising a smoothing step of adding pixels to the second pattern in positions within triangles formed by the right angles in the second pattern.

17. A method of enlarging a character that is represented by a first pattern of pixels, comprising the following steps:

converting pixels of the first pattern to corresponding rectangles of pixels in a second pattern of pixels;

sequentially checking individual pixels of the first pattern to determine whether they form acute right angles, each acute right angle in the first pattern having a corresponding right angle in the second pattern;

classifying each acute right angle in the first pattern in terms of its orientation;

identifying horizontal and vertical edges associated with the acute right angles using steps that depend on the classifications of the acute right angles, the horizontal and vertical edges having corresponding lengths;

determining the lengths of the horizontal and vertical edges of the acute right angles in the first pattern using steps that depend on the classifications of the acute right angles;

smoothing a particular right angle in the second pattern only if the horizontal and vertical edges of the corresponding acute right angle in the first pattern have lengths that are less than predetermined values.

18. A method as recited in claim 17, further comprising the following additional steps:

for each identified acute right angle in the first pattern, identifying neighboring right angles in the first pattern, the neighboring right angles having horizontal and vertical edges with corresponding lengths;

determining the lengths of the horizontal and vertical edges of the neighboring right angles in the first pattern;

smoothing said particular right angle in the second pattern only if the horizontal and vertical edges of the neighboring right angles in the first pattern have lengths within prescribed limits.

19. A method as recited in claim 17, further comprising smoothing said particular right angle in the second pattern only if the horizontal and vertical edges of the corresponding acute right angle in the first pattern have lengths that are less than predetermined values.

* * * * *